United States Patent [19]

Chu

[11] Patent Number: 4,661,716
[45] Date of Patent: Apr. 28, 1987

[54] UNLIMITED AND CONTINUOUS PNEUMATIC GENERATING SYSTEM TO BE DRIVEN WITH THE SEA WAVE FORCE

[76] Inventor: Chun T. Chu, No. 66, Ta Ting Hsin Chun, Pan Chiao City, Taiwan

[21] Appl. No.: 704,580

[22] Filed: Feb. 22, 1985

[51] Int. Cl.$^4$ .............................................. F03B 13/10
[52] U.S. Cl. ...................................... 290/53; 417/330
[58] Field of Search ....................... 290/52, 53, 54, 42, 290/43; 417/330, 331

[56] References Cited

U.S. PATENT DOCUMENTS

| | | | |
|---|---|---|---|
| 4,137,005 | 1/1979 | Comstock | 290/53 X |
| 4,392,060 | 7/1983 | Ivy | 290/53 |
| 4,560,884 | 12/1985 | Whittecar | 290/53 X |

Primary Examiner—L. T. Hix
Assistant Examiner—Brian W. Brown
Attorney, Agent, or Firm—Balogh, Osann, Kramer, Dvorak, Genova & Traub

[57] ABSTRACT

It is an unlimited and continuous pneumatic generating system to be driven with the sea-wave force (the power to be generated may optionally be designed). This system can effectively absorb the motive force of sea-waves from almost any direction, and can convert that force into a mechanical force, which is further converted into a pneumatic force. The pneumatic force is transmitted to the shore, being divided into two portions, of which one portion (A) is used for generating electric power, while the other portion (B) is to be stored up as a spare energy, which may be used upon having no sea-wave force to be absorbed from the sea for directly generating power.

5 Claims, 24 Drawing Figures

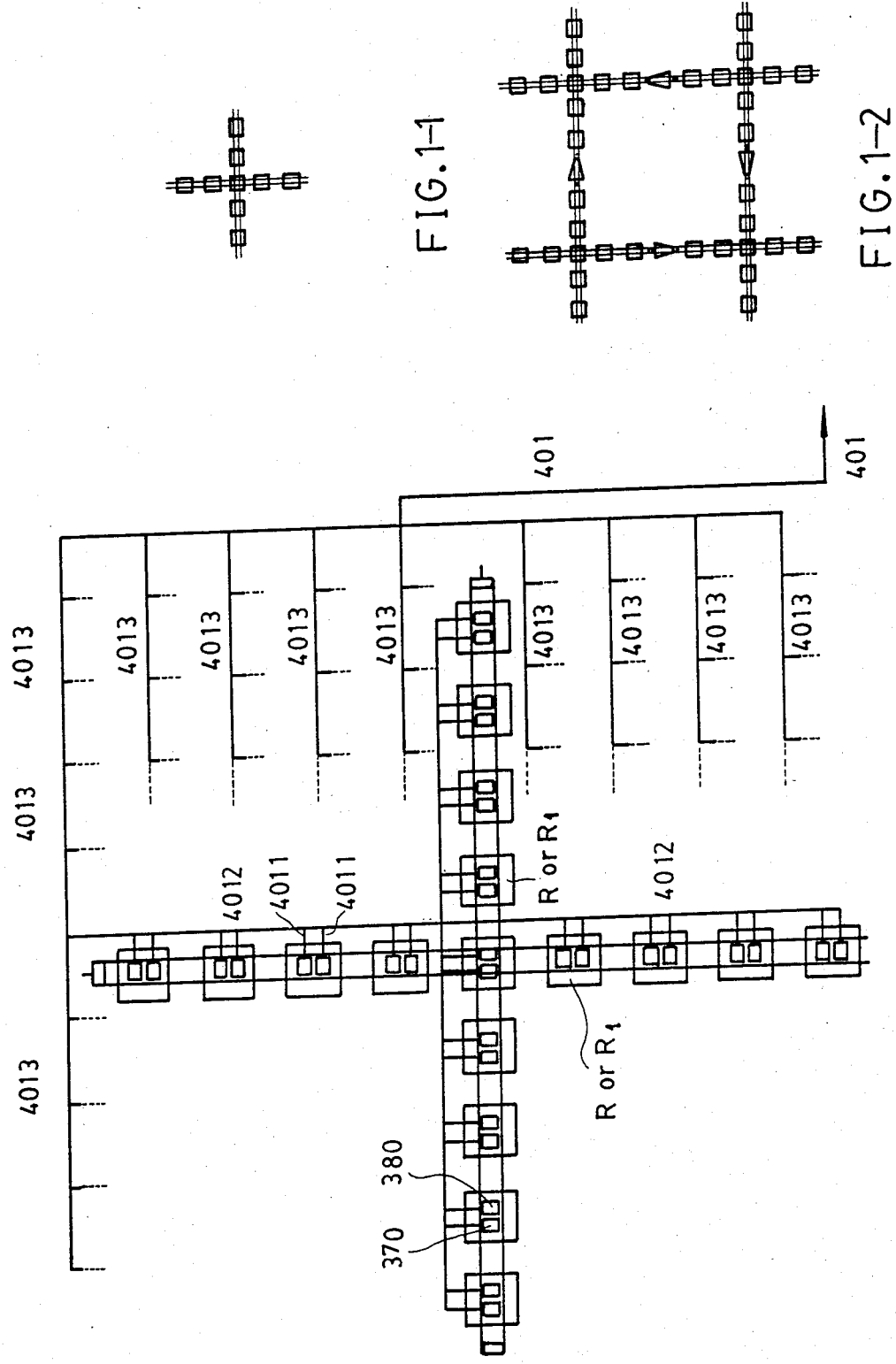

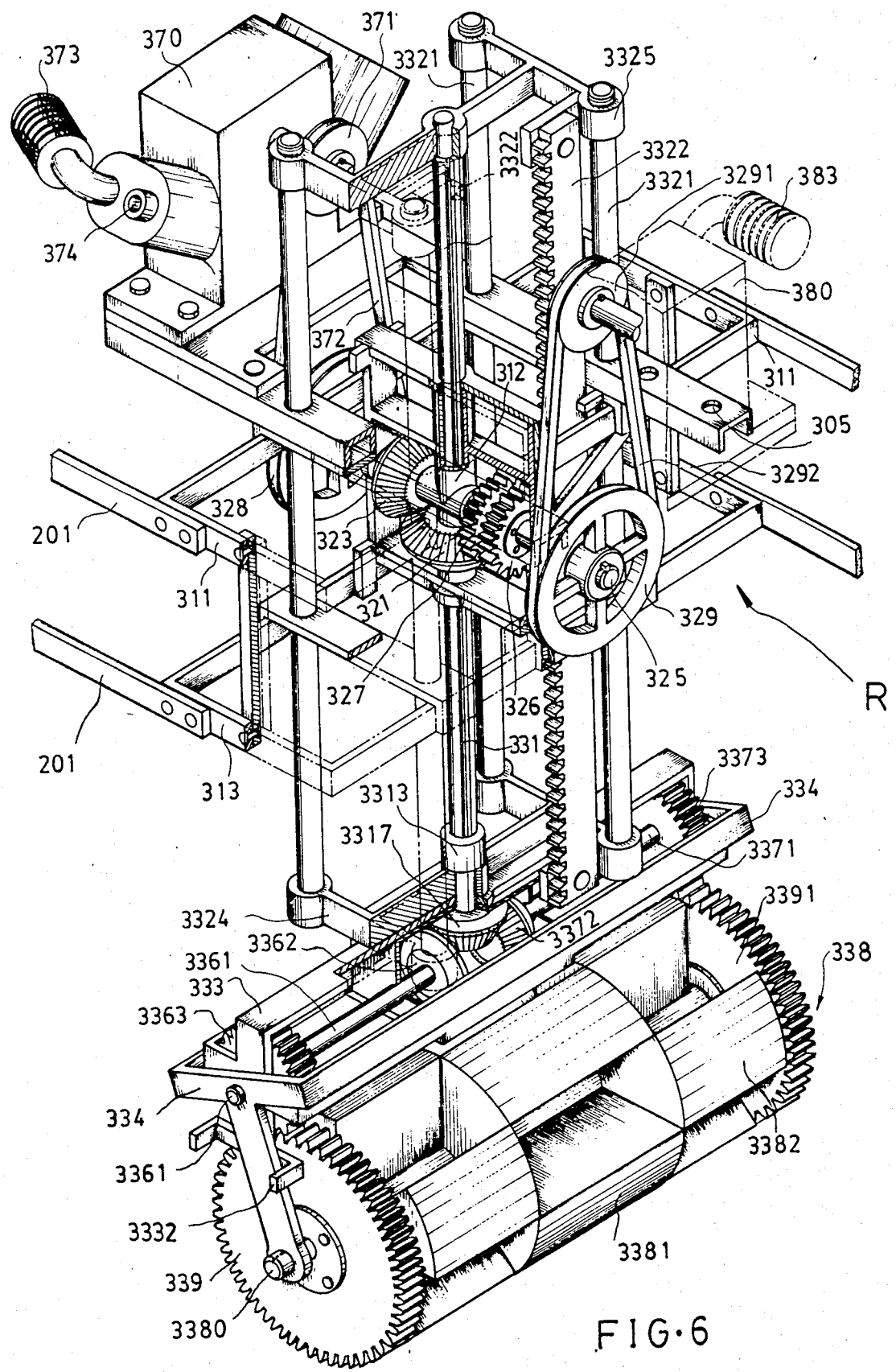
FIG·6

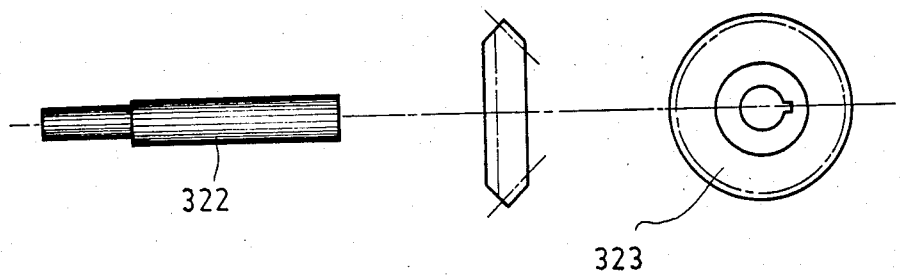
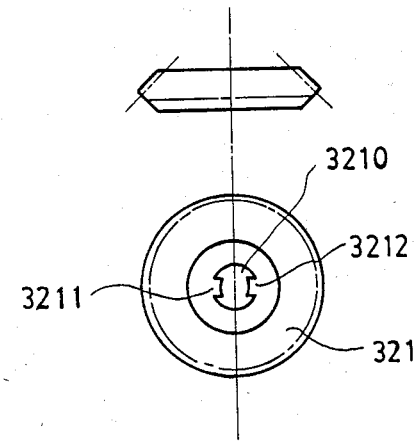
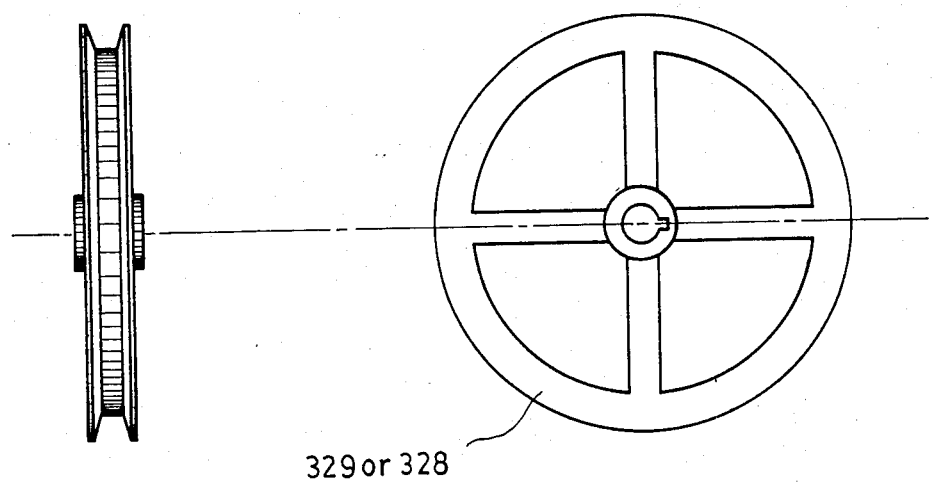
FIG.9

FIG·16

|  | Jan. | Feb. | Mar. | Apr. | May. | Jun. | Jul. | Aug. | Sep. | Oct. | Nov. | Dec. |
|---|---|---|---|---|---|---|---|---|---|---|---|---|
| 1. | 8.2 | 8.5 | 14.2 | 11.4 | 4.7 | 11.2 | 11.7 | 4.7 | 3.6 | 4.5 | 12.3 | 8.8 |
| 2. | 8.1 | 7.8 | 14.6 | 7.7 | 6.9 | 9.7 | 19.9 | 4.3 | 3.6 | 13.2 | 10.8 | 8.9 |
| 3. | 100 | 6.9 | 14.6 | 8.6 | 11.9 | 9.1 | 21.0 | 3.8 | 3.4 | 12.7 | 11.7 | 11.5 |
| 4. | 1.0 | 7.6 | 10.1 | 9.4 | 5.7 | 12.7 | 18.7 | 2.9 | 2.6 | 13.9 | 17.2 | 10.7 |
| 5. | 10.5 | 14.3 | 7.3 | 5.9 | 16.8 | 13.0 | 14.8 | 5.2 | 2.9 | 11.2 | 22.9 | 13.4 |
| 6. | 16.2 | 13.2 | 8.2 | 5.7 | 13.4 | 5.7 | 16.0 | 4.7 | 1.8 | 7.3 | 14.9 | 17.0 |
| 7. | 7.0 | 6.8 | 7.7 | 9.9 | 16.5 | 4.0 | 18.4 | 3.9 | 3.5 | 6.1 | 13.6 | 15.8 |
| 8. | 8.3 | 8.0 | 5.2 | 7.3 | 12.8 | 8.3 | 21.3 | 3.5 | 2.5 | 4.8 | 14.2 | 14.4 |
| 9. | 17.4 | 5.7 | 5.4 | 5.4 | 8.4 | 13.3 | 18.6 | 15.7 | 7.8 | 9.1 | 17.8 | 10.6 |
| 10. | 19.0 | 6.9 | 9.6 | 6.6 | 6.9 | 12.8 | 16.9 | 21.9 | 8.0 | 10.2 | 6.6 | 9.2 |
| 11. | 17.2 | 9.6 | 8.2 | 13.1 | 4.8 | 10.1 | 14.4 | 11.7 | 7.6 | 10.1 | 15.1 | 9.1 |
| 12. | 12.7 | 8.0 | 13.5 | 8.8 | 3.9 | 11.6 | 10.5 | 9.7 | 7.9 | 11.1 | 11.5 | 9.0 |
| 13. | 8.4 | 7.0 | 10.0 | 7.7 | 13.8 | 10.9 | 5.6 | 3.1 | 9.8 | 8.7 | 10.4 | 12.3 |
| 14. | 11.5 | 5.8 | 6.8 | 11.0 | 10.4 | 6.4 | 3.0 | 3.6 | 15.0 | 9.2 | 17.4 | 13.6 |
| 15. | 12.1 | 6.3 | 5.9 | 3.8 | 6.9 | 5.9 | 2.5 | 2.7 | 12.1 | 16.4 | 14.6 | 9.2 |
| 16. | 15.4 | 6.5 | 7.0 | 8.7 | 4.7 | 6.1 | 2.9 | 2.5 | 9.5 | 16.0 | 8.9 | 5.5 |
| 17. | 13.0 | 6.8 | 10.2 | 14.4 | 7.4 | 6.4 | 4.3 | 6.1 | 8.9 | 6.7 | 7.7 | 7.4 |
| 18. | 11.5 | 4.7 | 7.1 | 11.3 | 6.7 | 4.2 | 9.1 | 6.1 | 7.9 | 1.8 | 11.7 | 8.2 |
| 19. | 10.5 | 17.1 | 19.7 | 8.1 | 8.9 | 3.6 | 5.1 | 5.4 | 3.9 | 8.2 | 11.1 | 7.1 |
| 20. | 8.8 | 17.4 | 13.1 | 5.9 | 8.2 | 3.8 | 4.7 | 4.3 | 2.1 | 6.1 | 17.5 | 4.1 |
| 21. | 11.5 | 8.5 | 9.3 | 7.7 | 10.4 | 8.2 | 6.1 | 4.1 | 4.2 | 9.8 | 16.4 | 9.3 |
| 22. | 12.0 | 6.8 | 12.2 | 5.6 | 9.6 | 10.3 | 5.7 | 12.3 | 15.4 | 8.1 | 14.4 | 4.2 |
| 23. | 13.3 | 12.9 | 15.4 | 9.5 | 9.1 | 10.1 | 2.8 | 10.4 | 17.8 | 13.2 | 15.6 | 4.4 |
| 24. | 11.8 | 8.7 | 15.4 | 15.0 | 9.6 | 5.7 | 6.8 | 7.6 | 11.5 | 10.0 | 14.2 | 6.2 |
| 25. | 11.3 | 11.8 | 14.7 | 5.6 | 9.6 | 7.5 | 7.5 | 6.4 | 4.5 | 15.9 | 13.1 | 7.1 |
| 26. | 8.2 | 12.7 | 5.0 | 4.6 | 5.9 | 9.4 | 4.2 | 6.0 | 11.1 | 10.2 | 16.1 | 19.7 |
| 27. | 12.7 | 6.7 | 3.5 | 4.4 | 15.7 | 7.6 | 4.9 | 3.8 | 9.5 | 6.9 | 12.9 | 15.5 |
| 28. | 9.8 | 13.5 | 7.7 | 4.4 | 16.7 | 9.3 | 5.2 | 2.5 | 9.9 | 7.9 | 12.6 | 16.1 |
| 29. | 9.9 | 16.4 | 4.9 | 6.2 | 18.2 | 17.0 | 4.9 | 6.2 | 8.8 | 12.0 | 12.1 | 14.5 |
| 30. | 17.2 |  | 5.1 | 10.5 | 18.2 | 13.5 | 3.6 | 7.4 | 5.9 | 8.4 | 10.6 | 13.5 |
| 31. | 10.5 |  | 13.5 |  | 13.5 |  | 4.8 | 6.8 |  | 12.6 |  | 19.7 |

FIG.19

UNLIMITED AND CONTINUOUS PNEUMATIC GENERATING SYSTEM TO BE DRIVEN WITH THE SEA WAVE FORCE

BACKGROUND OF THE INVENTION

It has been discovered by our mankind that the sea-wave motion can provide us with a permanent energy. According to scientist's studies, the various kinds of dynamic forces generated by the waves may be equivalent to $25 \times 10^{12}$ KW (kilo watts) per second; that figure is equal to about 4,000 times of the total energy consumed by the whole population in the world per second. That permanent and enormous energy source is formed by some natural factors such as the sun light radiated in the air and to the sea surface, and attractive forces from the sun, the moon and stars to the ocean of the earth. Naturally, as long as the aforesaid natural factors are existing, the sea-wave motion energy will be ready for use fore ever. Once an economical sea-wave generating system is developed to generate a very cheap power, the energy required daily by our mankind will not be relied upon the existing energy materials such as oil, coal and nuclear energy, which are susceptible to air pollution. Further, the new energy may also be able to improve the existing world economic state because that cheap and permanent energy not only can provide power for illumination, electric appliances, and the industries, but also can be used for manufacturing a cheap liquid hydrogen, which can replace the gasoline, and can be used for the fuel of vehicle, ship, airplane, and missile. The liquid hydrogen can provide 20% more energy than gasoline with the same unit of liquid measure without causing any air pollution. At the present time, the cost of manufacturing a unit of liquid hydrogen same as that of gasoline by means of electric power would be about 18 to 20 times as the cost of the gasoline. If a permanent and cheap sea-wave electric power were provided, a liquid hydrogen being cheaper than gasoline could be manufactured. Then, all the machines that are operated with gasoline would use the liquid hydrogen, and the world economic situation would also be improved. A new world era will start.

Since it is practicable to use the sea-wave energy to the world economic situation, many countries have put a considerable amount of investment in developing sea-wave generating system in a hope of solving the existing world economic problems as soon as possible. Unfortunately, there is no successful example so far. At the present time, the power generated with the sea-wave energy can only be used for the buoy, or warning sign, etc. at the sea. The power generated is too small to be used for large industrial purpose; for instance, in case of the sea having small wave or having no waves for a number of days, no power will be generated and supplied continuously. The very reason of being unable to generate a large electric power with the sea-wave is that there is no adequate equipment to convert the sea-wave force into electric power. According to the relevant information, some devices being used by some countries for converting the sea-wave into mechanical power (or pneumatic force) are generally including an air chamber and an air inlet/outlet port with a piston. The air chamber may be fixed at the water level by the chamber on the top of a vertical post, of which the lower end is fixed on the sea bottom, or may be fixed on an experimental ship (or generating ship). The ship is anchored at the sea for stable purpose; under the air chamber, a water inlet is open. On the top portion, the air inlet/outlet port with piston is open. Upon a sea-wave moving towards the vicinity of the air chamber, the sea water will enter into the air chamber to move upwards. The raising water level will force the air in the air chamber to flow out of the inlet/outlet port; then, the out flow air will push the piston outwards to generate a mechanical force. Upon the recess portion of a sea-wave approaching the air chamber, the water level in the air chamber will drop downwards, and the air outside the air chamber will be drawn into the chamber to push the piston inwards to generate a mechancial force again. The aforesaid two-way mechanical force may be used for driving a generator. This kind of device a mentioned above is simple in construction, and easy to manufacture; however, it does have some inherent drawbacks; therefore, it is unable to convert the sea-wave into a higher mechanical force for generating more electric power. The aforesaid major drawbacks are as follows:

1. The air chamber only can absorb the moving upward and downward force of the sea-wave, but can not utilize or absorb the moving forward and backward forces in a sea-wave, which are many times higher than the up-and-down moving forces of a sea-wave.

2. The wall of the air chamber and the body of the generating ship have an effect of damping the sea-wave force; in other words, when the wave peak reaches the wall of the air chamber or the body portion of the generating ship, the powerful wave moves perpendicularly towards the wall of air chamber or the body portion of generating ship; as a result, most part of the motion force of the sea-wave could be wasted on the wall or the ship body, and the height of raising water level inside the air chamber will be reduced. Likewise, when the recess portion of a wave reaches the wall of air chamber or the body portion of a generating ship, the powerful withdrawal force will be damped a considerable part, and the dropping depth of water level inside the air chamber will also be reduced. This phenomenon will limit the air chamber to absorb a wave having a height over 1 (one) meter as mentioned in my in formation collected.

3. In some published materials it has been alleged that the size of the generating ship should be reduced further; however, a small-sized ship will give rise to two drawbacks as follows;

1. Since the size of the generating ship is limited, the area of the sea surface covered by the air chamber in the ship will also be limited; in other words, the floating capacity of sea-wave to be received by the air chamber is to be limited, and the power generated by the generator is naturally limited.

2. Since the size of the generating ship is small, an unstable drawback will happen to the ship, i.e., the anchoring problem will follow immediately. Since the air chamber is susceptible to floating, its operation lever fulcrum in absorbing the sea-wave is unstable. An unstable lever fulcrum will be unable to absorb a sufficient sea-wave force. In some experimental device of air chamber type of generating system, a fixed air chamber may be constructed along the sea shore; however, that fixed type of air chamber is susceptible to terrain problem and ocean construction limit. So far, there is no any prior art that can continuously generate power with a calm or smooth sea for many days; in other words, there is no successful sea-wave generating system in other countries.

SUMMARY OF THE INVENTION

This invention relates to "An Unlimited and continuous Pneumatic Generating Network System To Be Driven with the Sea Wave Force", to say "unlimited" is to say that the generating system of the present invention may increased or reduced in accordance with the power required without being limited by the sea surface area. To say "continuous" is to to say that the generating system of the present invention can continuously to generate power upon a calm sea or a very rough sea, such as during typhoon coming, being lasted for many days. A mechanical device being used for absorbing the sea-wave force to be converted into a mechanical force is a means, which is not an air chamber, but is a device able to absorb the water elements in a wave to move circularly, up and down, back and forth, etc., i.e., the motion force of water in all directions may be converted into a mechanical force, which will be converted into a pneumatic force. This perfect device to absorb the sea-wave force may best named as "Absorber". When many of these absorbers are arranged at the sea as a network, it may be called as "Absorbing Network", which can absorb a great deal of sea-wave force to convert into a pneumatic force.

During a calm sea or the sea having little wave, the system of the present invention can still generate power because that the system is provided with an energy storage device. The pneumatic force absorbed by the absorbing network is divided into two portions (A and B). Normally, the portion A pneumatic force is used for generating electric power, while portion B pneumatic force is converted into liquid air being stored up. In case of having little wave or having no wave at sea, the spare liquid air will automatically released by the generating system to convert into gaseous air, i.e., a pneumatic force to drive the generator so as to obtain normal power supply; in other words, the present invention can improve or overcome the difficulty encountered by the conventional air-chamber type of generating device. The perpetual energy to be generated with the present invention not only can substitute for the nuclear energy, but also can solve the energy crisis that might be raised again by the exhausting oil and coal. In conclusion, the present invention is possessed of four major features:

1. Having a high efficiency in absorbing the sea-wave force because of the absorber of sea-wave being able to absorb the up and down moving wave and the back and forth moving wave, which have an amplitude less than one meter; moreover, the absorbers may be spreaded over a vast area at sea for absorbing a great deal of sea-wave energy to be converted into electric power.

2. Being not susceptible to damage because of a buffer means having been furnished in the absorbing network.

3. Lower construction cost: According to a preliminary estimate, the construction cost of such a system may be recovered with the electric bill within several decades of months.

4. Continuously generating power even when a calm sea or a very small sea-wave existing and lasting for a period of time.

BRIEF DESCRIPTION OF DRAWINGS

FIG. 1-1 is a top view of the absorbers in the present invention being arranged in cross shape.

FIG. 1-2 is a top view of the absorbers in the present invention being arranged in square-shape frame.

FIG. 1-3 illustrates the air pipe arrangement in the absorbing network system.

FIG. 2 is a perspective view of the cross-arranged absorbers of the present invention.

FIG. 3 illustrates the sea-wave moving in a direction in the system according to the present invention.

FIG. 6-1 is a perspective view of the buoy in the floating frame of the present invention.

FIG. 9 illustrates the various transmission gears in the frame assembly.

FIG. 12-1 is a sectional view of the connecting frame as shown in FIG. 12.

FIG. 19 contains a Table which shows wind velocity records of LAN YU Island in 1976.

DETAILED DESCRIPTION

Figure 1:
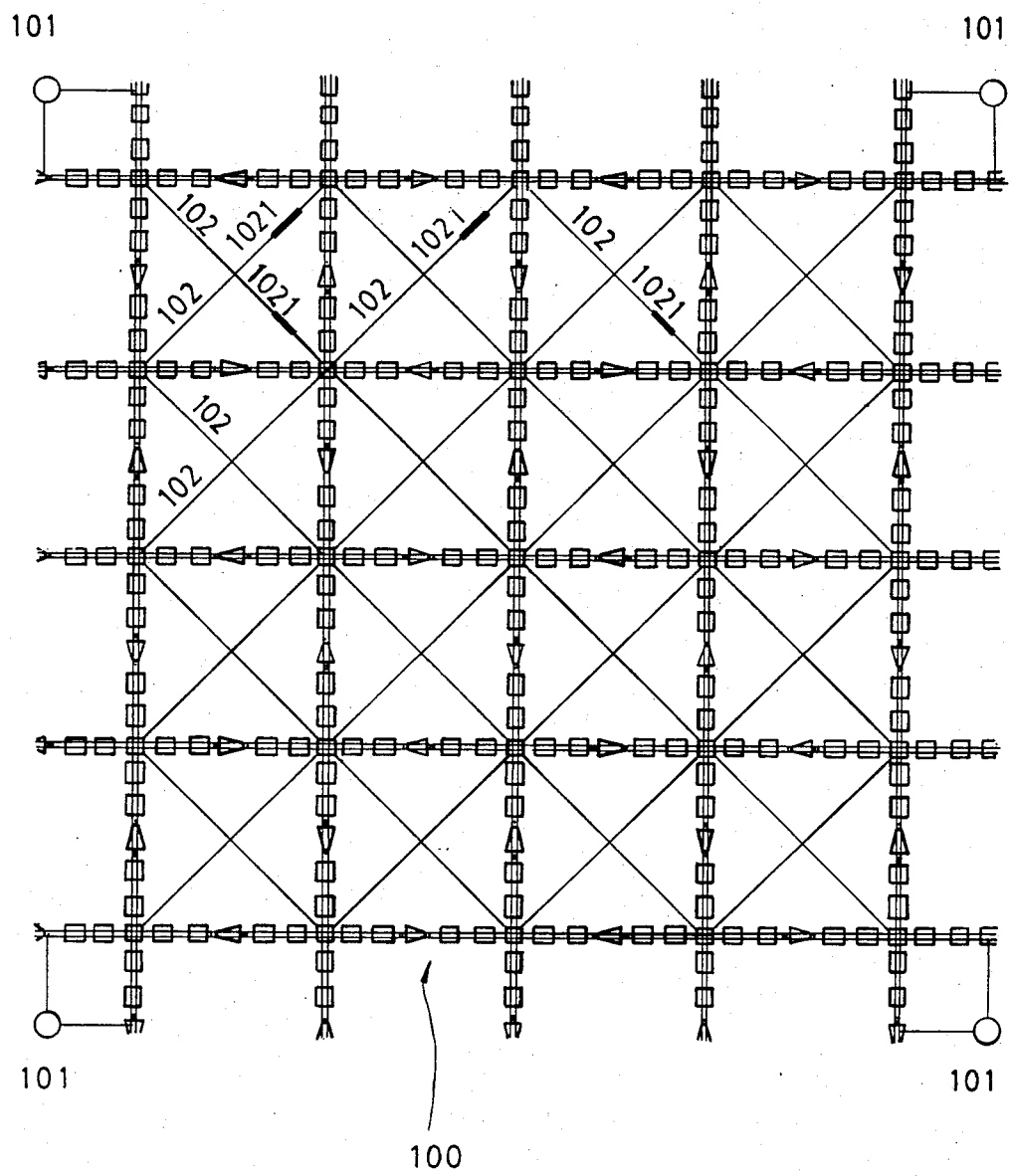
FIG. 1 is a top view of the absorbing network of the present invention.
Figure 2:
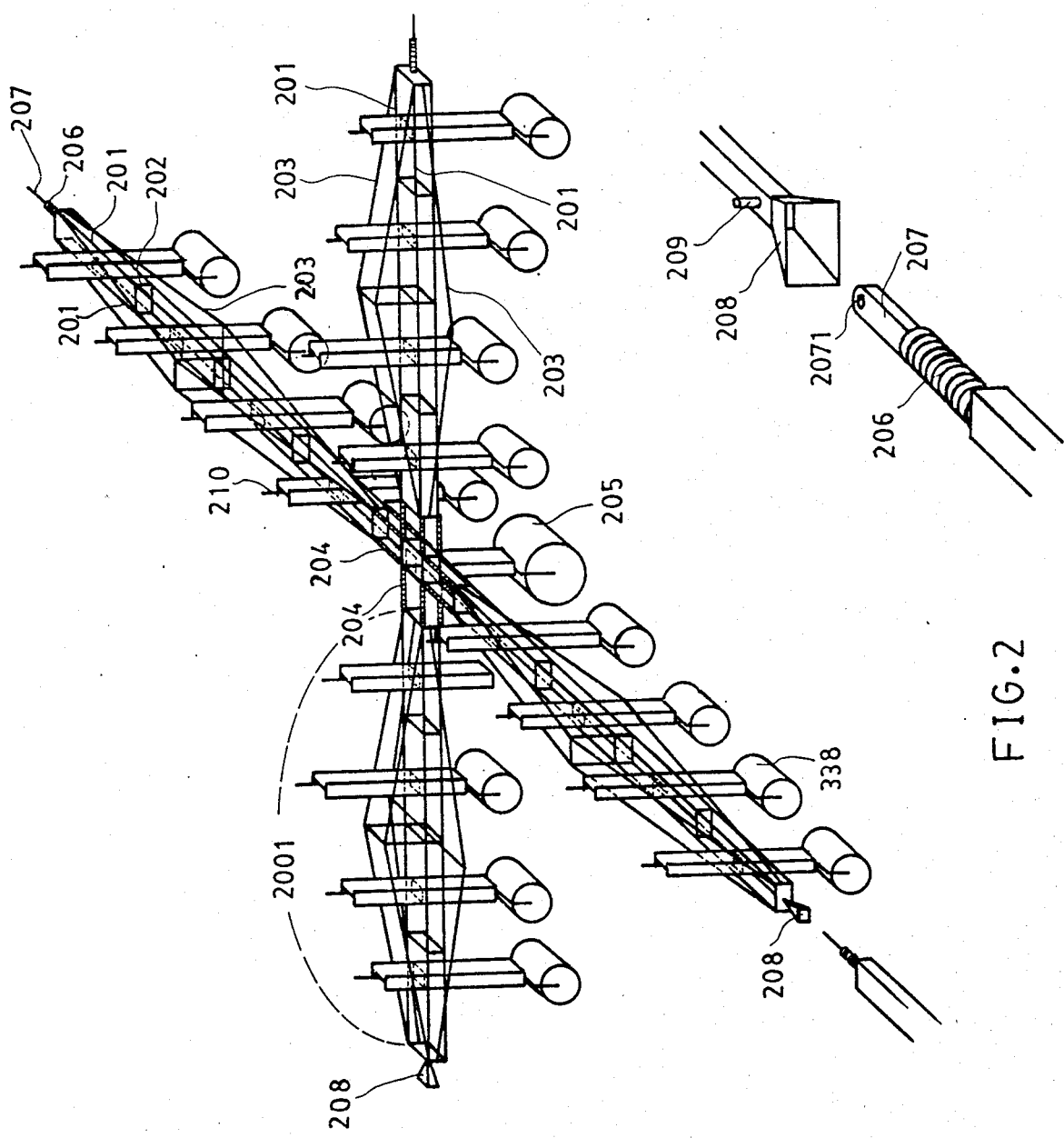
Figure 3:
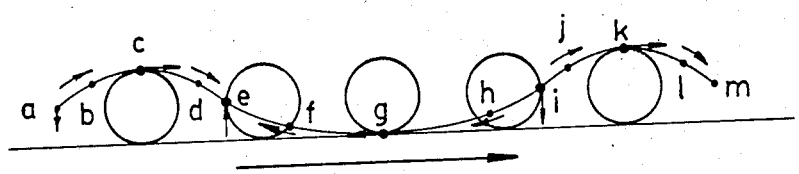
Figures 1, 6:
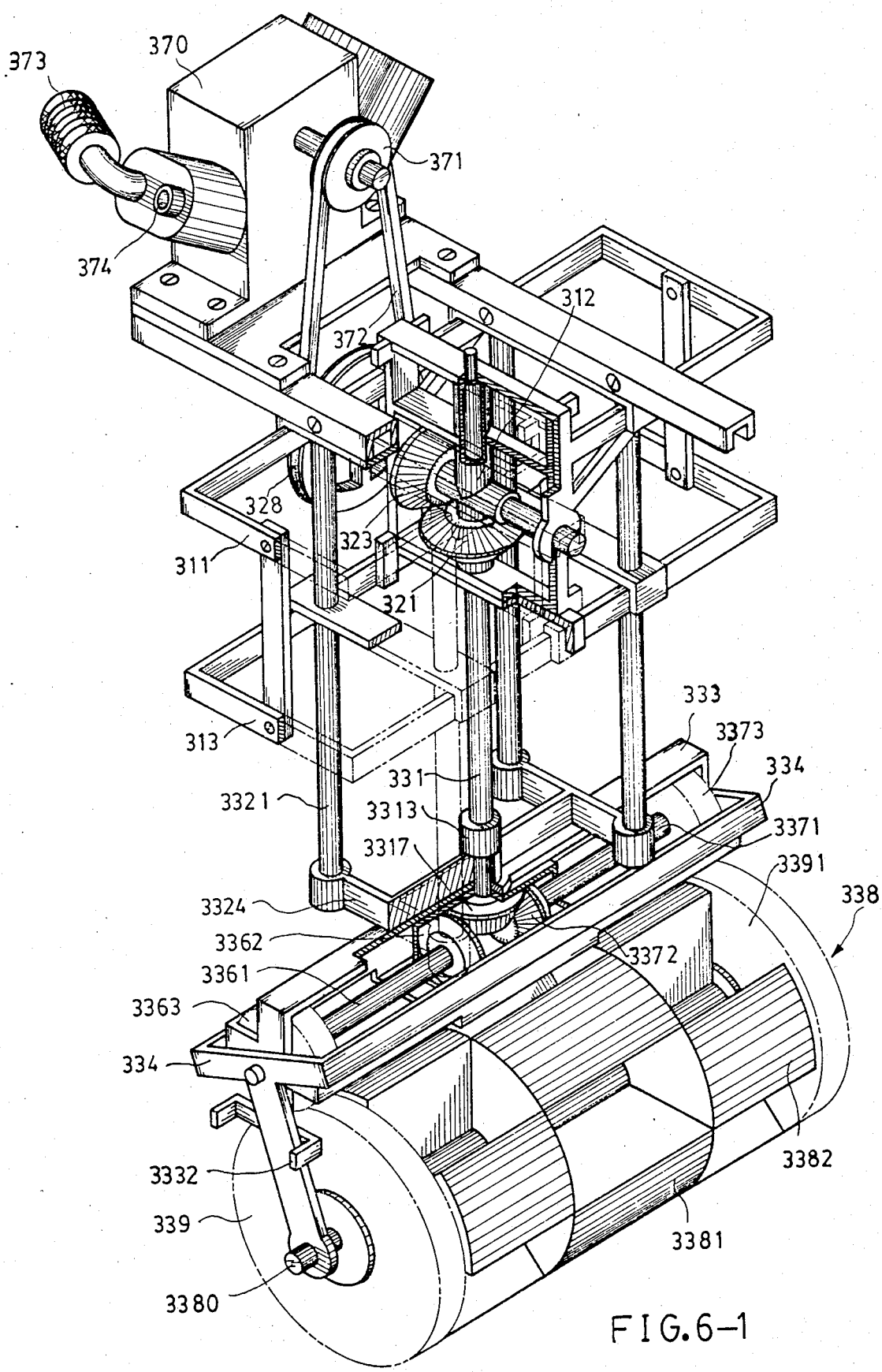
FIG. 6 is a perspective view of the one-wheel type of absorber of the present invention.

Referring to FIG. 1, there is shown a top view of the absorbing network 100 of the present invention, which includes a plurality of cross-arranged absorbers in equal size as shown in FIG. 1-1. FIG. 2 illustrates a perspective view of one of the cross-arranged absorbers. The small square blocks shown in FIGS. 1 and 1-1 stand for the absorbers in the cross-shaped absorber frame. In FIG. 2, the absorbers are indicated with a number of rollers, but the embodiment of these absorbers may be seem in FIGS. 6 or 17. Referring to FIGS. 1 and 1-1 again, there are shown two parallel lines, which stand for the rigid frames 201 as shown in FIGS. 2 and 6. The absorbing wheel as shown in FIGS. 2 or 6 is always floating on the sea, and therefore the rigid frame 201 of the cross-shaped absorber frame is always located above the sea water surface. The anchor 101 shown in FIG. 1 may be a fixed or non-fixing anchor for fixing the absorbing network in position. More anchors may be used in case of the four anchors having insufficient force to fix the network. On each of the diagonal of square-shaped absorber frame, there is furnished with a spring 1021 and a steel cable 102 for maintaining the absorbing network in suitable shape upon being struck by a high wave so as to prevent the network from being destroyed. Upon the high waves being over, the absorbing network will recover to its original form. The circle in the center of the network stands for a small but, in which a watchman may stay therein or some communication equipment and air pressure gauge, etc. may be stored. The sea area to be covered with an absorbing network is dependent upon the volume of electric power required; for instance, an absorbing network set up on a sea surface having waves of about one meter high for a generator of 1000 KW requires an area about 1.6 KM$^2$. Since an absorbing network covers a considerable large sea area, the network frame would be rather stable on the sea; therefore, the absorbers on the network frame would have better lever fulcrum in terms of mechanical force. The movable parts of the absorber may be floated up and down on the wave, or back and forth, or may be rotated forwards or reversely with the sea steam, but the network frame would not move up and down or back and forth with the wave. Referring to FIG. 6, there are shown two air compressors 370 and 380, which are mounted in the absorber to compress the air. Referring to FIG. 1-3, there is shown an air pipe diagram showing the compressed air being collected from various absorbing networks; in that diagram, R or R1 stands for the absorber as shown in FIGS. 6 or 17, and 370 and 380 in FIG. 1-3 stand for the air compressors; the long or short lines in FIG. 1-3 stand for air pipes and the main air pipe. The compressed air first flows from the air compressors 370 and 380 pipe 4011 and then to pipe 4012; then, the compressed air flows from pipe 4012 to pipe 4013, and then flows into the main air pipe, from which the compressed air is transmitted to the shore for generating electric power. Referring to FIG. 2, there is shown a perspective view of cross-shaped absorber frame 200, in which the lateral and longitudinal lines stand for the rigid frame 201, and the square frame 202 therein is used for separating the four. Each cross-shaped absorber frame has four arm beams 2001, of which each is provided with some reinforced rods 203 for increasing the anti-twist force. In the center and between two arm beams 2001, there are provided with a number of strong springs 204 for furnishing a suitable elasticity between the arm beams and temporary deformation of the absorbing network in case of being struck by a high wave so as to restore its original arrangement after the high wave being over. 338 stands for the absorbing wheel as shown in FIG. 6. 205 stands for a buoy to support the cross-shaped absorber frame floating on the sea, and its embodiment is shown in FIG. 6-1. Under the buoy, there is furnished with an absorbing wheel 338, which can rotate forwards and reversely so as to absorb the wave force and to convert it into mechanical force for prodveing the compressed air. The only difference between the buoy and the one-wheel type of absorber R is that the buoy is fixedly mounted under the center of cross-arranged absorber frame without having the up-and-down mechanism (325, 326, 327, 329, 3291, 380) as shown in FIG. 6, i.e., only absoring the moving back and forth force of the sea wave. The structure and theory of the one-wheel type of absorber will be described hereinafter. FIG. 2 illustrates the elements (206, 207, 208, 209) for quick set-up assembly for the network, in which 206 stands for a strong spring to be attached at the end of the cross-shaped absorber frame for providing a buffer function. 207 stands for a plug with a hole 2071 at the end of the strong spring; 208 stands for a conic socket. Upon a number of cross-shaped absorber frame for a network being ready, assemble a square-shaped absorber frame with four cross-shaped absorber frame as shown in FIG. 1-2 (The assembling method is to have the plug 207 at one end of the arm beam in one cross-shaped absorber frame inserted into a conic socket 208 at one end of the arm beam of one cross-shaped absorber frame; then, lock the plug and the conic socket together by inserting a pin 209 into the hole 2071. ); then, release a number of square-shaped absorber frames on the sea (All the square-shaped absorber frames can be floating on the sea stably, since each of them has four buoys). Link all the square-shaped absorber frames into an absorbing network with the quick set-up assembly. In FIG. 2, reference numeral 210 stands for lightning arrester. There are two objects for an absorbing network being assembled with a plurality of cross-shaped absorber frame, i.e. : 1. A cross-shaped absorber frame, or a square-shaped absorber frame takes small space to manufacture. 2. Since the arm beam in the cross-shaped absorber frame has a small size, it can withstand the strike of a rough sea without being broken, and the safety of whole network can be maintained.

Referring to FIG. 3, there is shown the water stream in a wave being moved in a circular direction in terms of a vertical space surface; from point "a" to point "m", it covers 1.5 wave length; the distance from $\overline{AB}$ to $\overline{CD}$ stands for the water stream having an ascending force. At points "C" and "K", the water stream has a horizontal and forward motive force; the water stream at point "g" has a horizontal and backward motive force; the water stream at points "b" and "j" has a moving up force, while the water stream at points "d" and "l" has a down-hill and forward motive force. The point "f" stands for the water stream having an uphill and backward motive force, while point "h" stands for the water stream having a down-hill and backward motive force.

The structure of the absorber is in such a manner that it can absorb the sea-wave force from almost all directions and convert them into a mechanical force and then into pneumatic force. This structure can overcome all the problems suffered from by the air chamber type of equipment. It is deemed as a break-through in the field of using sea-wave force to generate power, and it may be commercialized economically.

Figure 7:
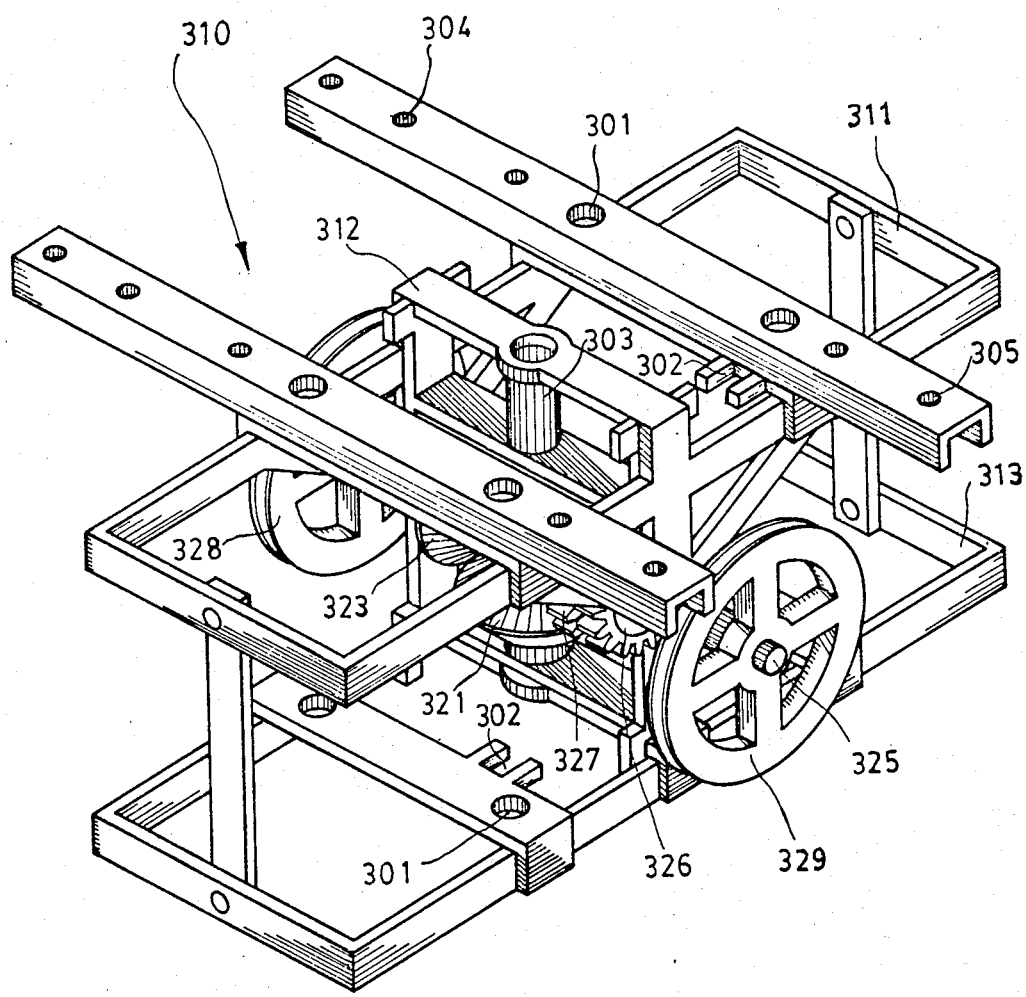
FIG. 7 is a perspective view of the frame assembly of the absorber in the present invention.
Figure 8:
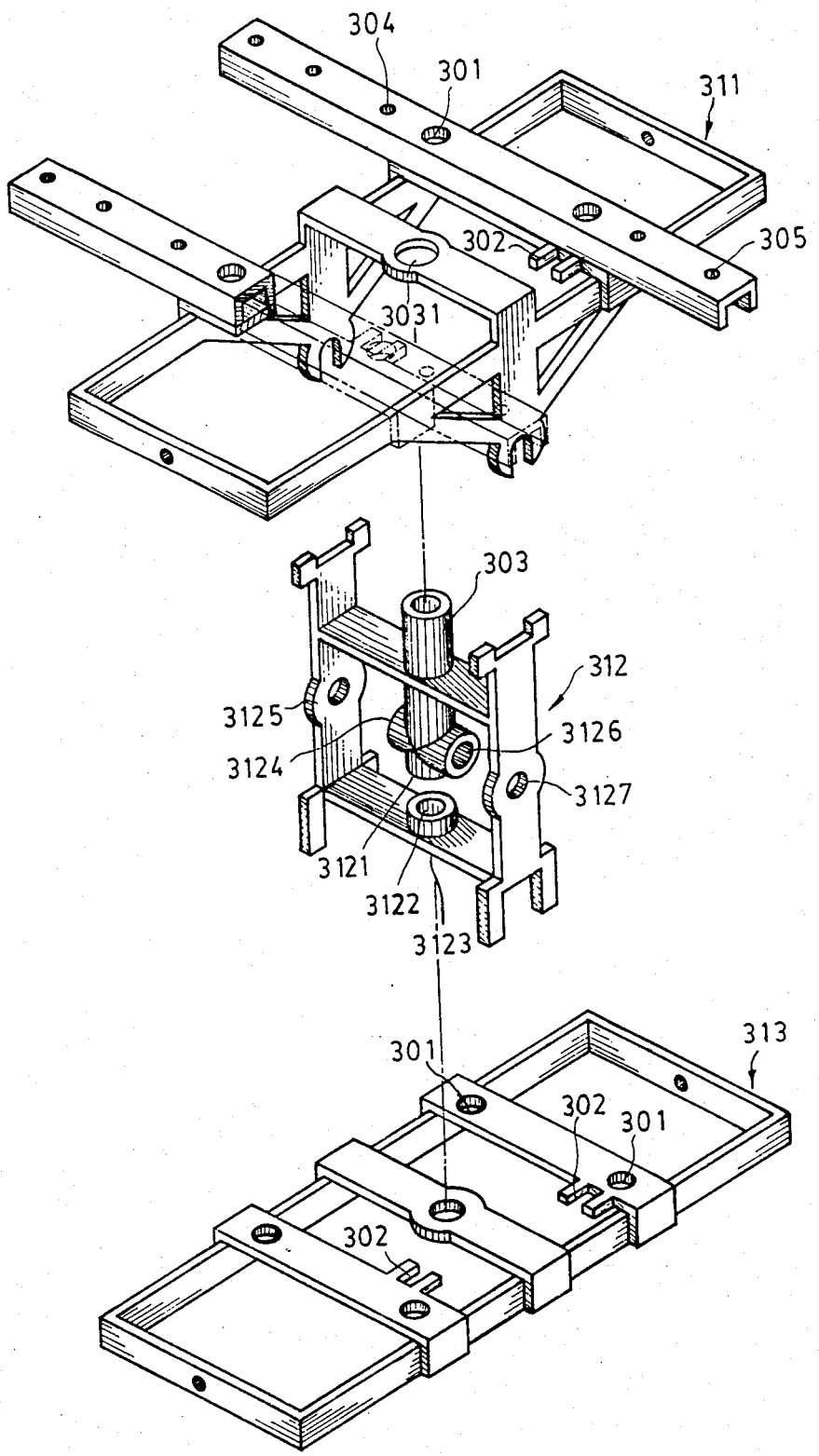
FIG. 8 is a disassembled view of the frame assembly shown in FIG. 7.
Figure 10:
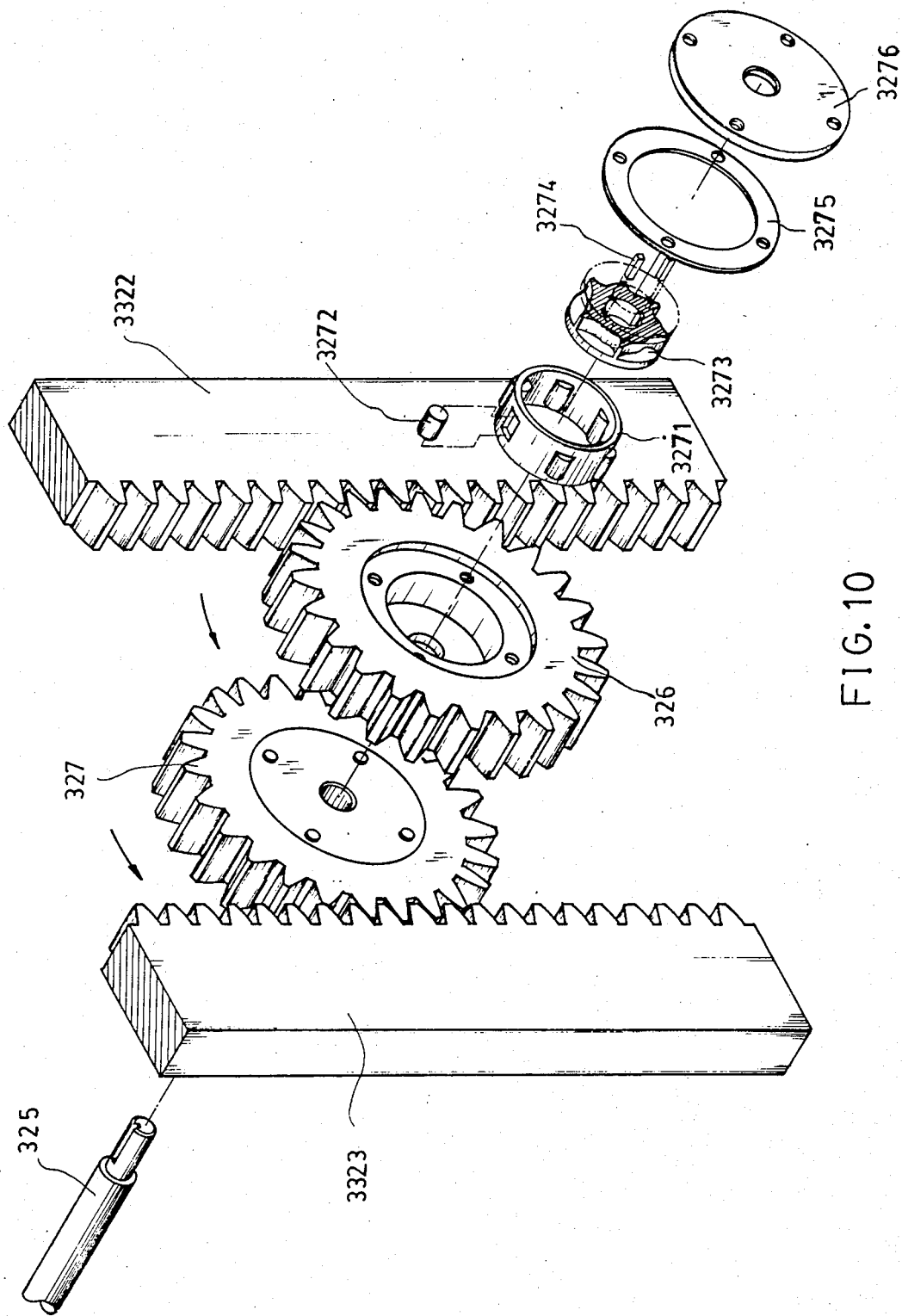
FIG. 10 is a disassembled view of the one-way transmission gears as shown in FIG. 6.
Figure 11:
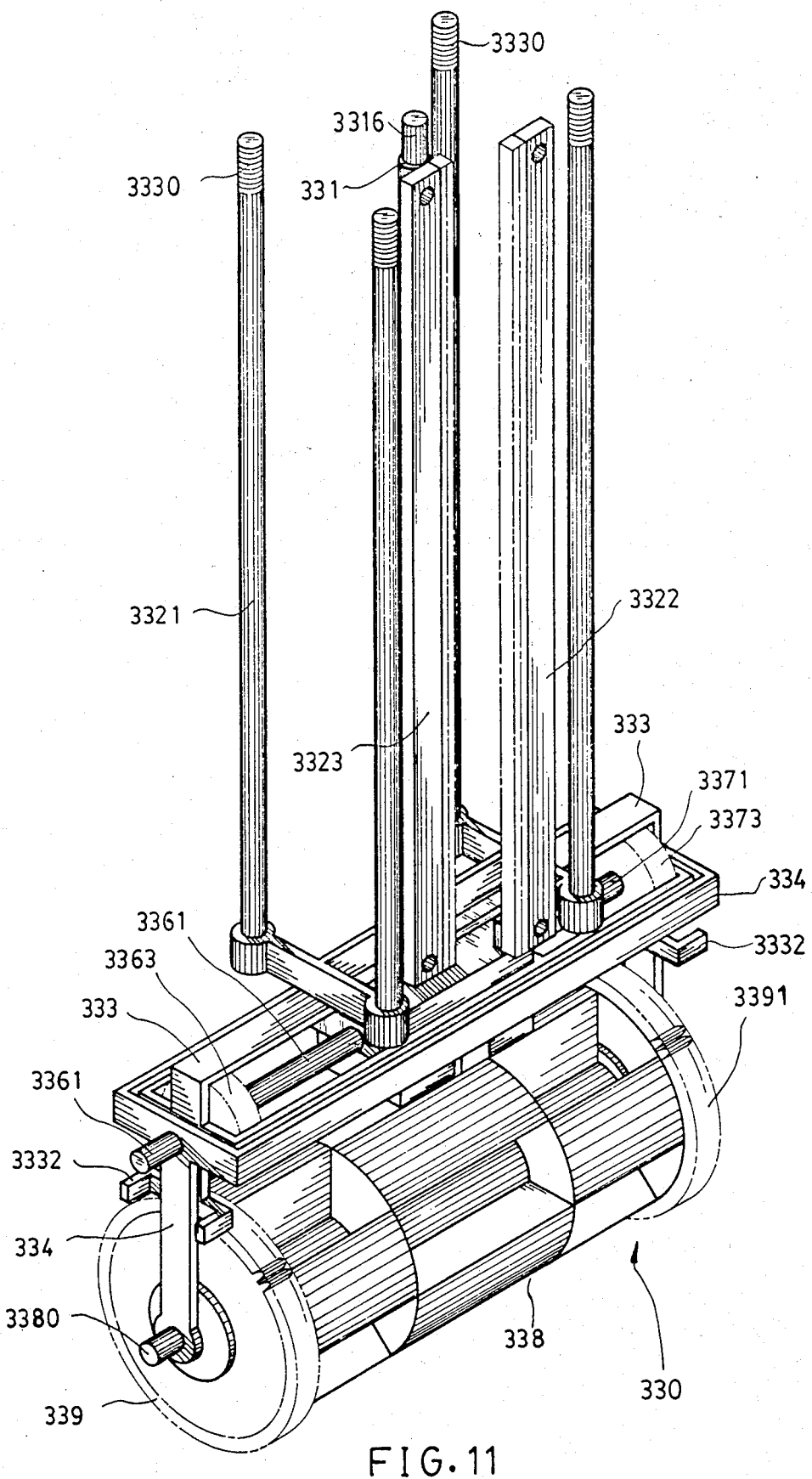
FIG. 11 is a perspective view of the ascending and descending assembly in the cross-arranged absorber.
Figure 13:
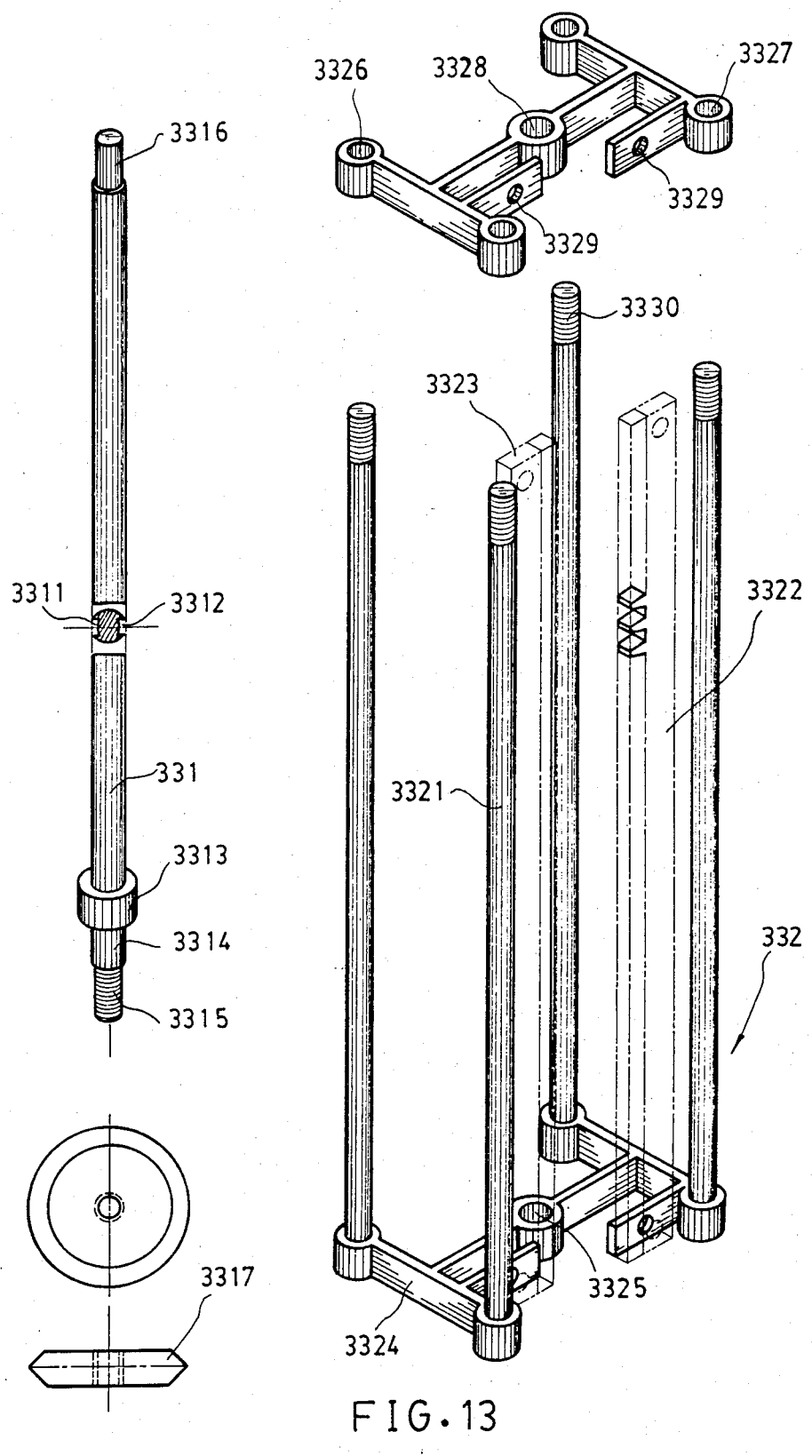
FIG. 13 is a disassembled view of an ascending and descending frame of the present invention.

Referring to FIG. 6, there is shown a one-wheel type of absorber being designed in accordance with the moving manner of the sea-wave, and this absorber includes a frame assembly 310 as shown in FIG. 7, an ascending and descending assembly 330 as Shown in FIG. 11, a top frame 3325 as shown in FIG. 13, an two air compressors 370 and 380 mounted on the frame assembly 310. All these assemblies are described in detail as follows:

Frame assembly 310 shown in FIG. 7 is a stationary assembly in the absorber. Upon the absorber being mounted on the cross-shaped absorber frame, two square frames 311 and 313 are used for mounting the stationary assembly on the rigid frame 201 of the cross-shaped absorber frame 200. After the cross-shaped absorber frame being incorporated into an absorbing network, it will become a part of the network, and will have a high stability; likewise, after the frame assembly being fixedly mounted on the cross-shaped absorber frame, it will also have a high stability. As long as the stationary assembly of the absorber has a high stability, the movable assembly of the absorber (i.e., the ascending and descending assembly 330 shown in FIG. 11)

will have a lever fulcrum by means of the stationary assembly so as to absorb the wave force to convert it into mechanical force. The frame assembly 310 mainly includes the square frames 311 and 313 and a sleeve frame 312 as shown in FIG. 8; then, it is added with bevel gears 321 and 323, a transmission shaft 322, two belt pulleys 328 and 329 as shown in FIG. 9, and two one-way transmission gears 326 and 327 and one transmission shaft 325 as shown in FIG. 10. The sleeve frame 312 shown in FIG. 8 may be considered as a frame to tidy up forces from all directions through the ascending and descending assembly so as to let the forces drive a number of air compressors (i.e. 370 and 380 shown in FIG. 6) to generate the compressed air. In FIG. 8, $\overline{303}$, $\overline{3121}$ and $\overline{3122}$ $\overline{3123}$ stand for two sections of sleeves respectively, but are aligned vertically; between $\overline{3121}$ and $\overline{3122}$, there is furnished with a space, in which a bevel gear 321 as shown in FIG. 9 is to be mounted. The bevel gear 321 has a center hole 3210, in which there are furnished with two large tooth 3211 and 3212 protruding symmetrically towards the center of the hole 3210. The size and shape of the hole 3210 can just let a transmission shaft 331 shown in FIG. 13 pass and mount therein for moving up and down. Upon the bevel gear 321 being mounted between the two pieces of sleeves 3121 and 3122 in the sleeve frame 312 as shown in FIG. 8, upon the transmission shaft 331 shown in FIG. 13 passing through the sleeves 3122 and 3123 in the sleeve frame 312 shown in FIG. 8, and passing through the center hole 3210 of the bevel gear 321 (At that time, the two large teeth 3211 and 3212 will engage with the two channels 3311 and 3312 on the transmission shaft 331.), and passing through the sleeves 303 and 3121, the two large teeth 3211 and 3212 will receive a transmission force during the shaft 331 rotating or moving axially to cause the bevel gear 321 rotating. Since the bevel gear 321 is mounted limitedly between sleeve 3121 and sleeve 3122, it can rotate only without moving up and down. The rotation force received by the bevel gear 321 will be transmitted to the air compressor (370 in FIG. 6) on the frame assembly 310, whereby a compressed air can be made.

The referrence numeral 323 in FIG. 9 also indicates a bevel gear being fixedly mounted through its center hole, on a transmission shaft 322, of which the right end is mounted in a shaft socket 3124 in the sleeve frame 312 as shown in FIG. 8, while the left end is passing through a shaft hole 3125 in sleeve frame 312, and is mounted with a belt pulley 328 as shown in FIG. 9. The bevel gear 323 is engaged with the bevel gear 321. Upon the bevel gear 321 being driven by the transmission shaft 331, rotational force will be transmitted, through transmission shaft 311, to the belt pulley 328.

Referring to FIG. 10, there are shown two one-way transmission gears 326 and 327 having the same structure each other, of which each includes a roller collar 3271, a number of rollers 3272, a roller clutch 3273, two keys, packing ring 3275, and a fixing plate 3276. (The structure of the one-way transmission gears 326 and 327 is the same as that of the one-way transmission gear in the current market.).

The transmission shaft 325 in FIG. 10 is to be mounted in the one-way transmission gears 326 and 327 for receiving the counter-clockwise rotational force. After the shaft 325 passing through the center holes of the gears 326 and 327, the left end thereof is mounted in the shaft socket 3126 of sleeve frame 312 as shown in FIG. 8; then, the right end of the shaft passes through a shaft hole 3127 of the frame 312, and then the end thereof is mounted with a belt pulley 328 as shown in FIG. 9.

The one-way transmission gear 326 is to be driven by an ascending rack 3322, and that driving force is then transmitted to transmission shaft 325. The one-way transmission gear 327 that drives the shaft 325 to rotate counter clockwise is driven by a descending rack 3323 as shown in FIG. 10. Upon the racks 3322 and 3323 ascending, the gears 326 and 327 will be driven respectively to rotate in different direction, but the gear 326 will drive shaft 325 to rotate counter-clockwise; at the same time, the gear 327 rotates clockwise and idly on shaft 325. Upon the racks 3323 and 3322 moving downwards simultaneously, the gears 326 and 327 will be driven respectively to rotate in different direction, but the gear 327 will drive the shaft 325 to rotate counterclockwise, while the gear 326 is idly rotating clockwise. Consequently, the frame assembly 310 shown in FIG. 7 assembled with the parts (311, 312, and 313) as shown in FIG. 8, the parts (322, 323, 321, 328 and 329) as shown in FIG. 9, and the parts (326m 327) as shown in FIG. 10.

Figure 12:
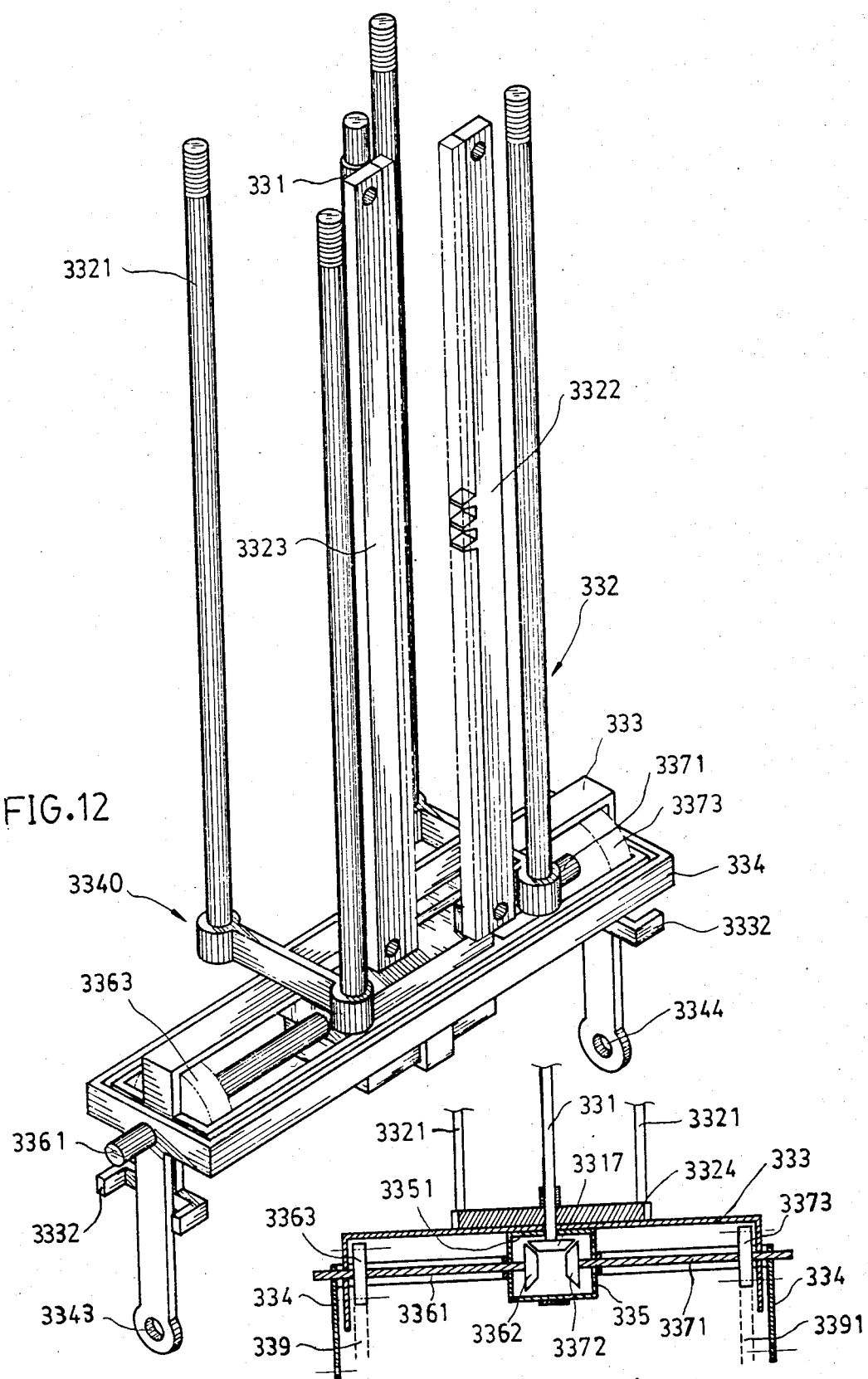
FIG. 12 is a perspective view of the connecting frame in the present invention.
Figure 14:
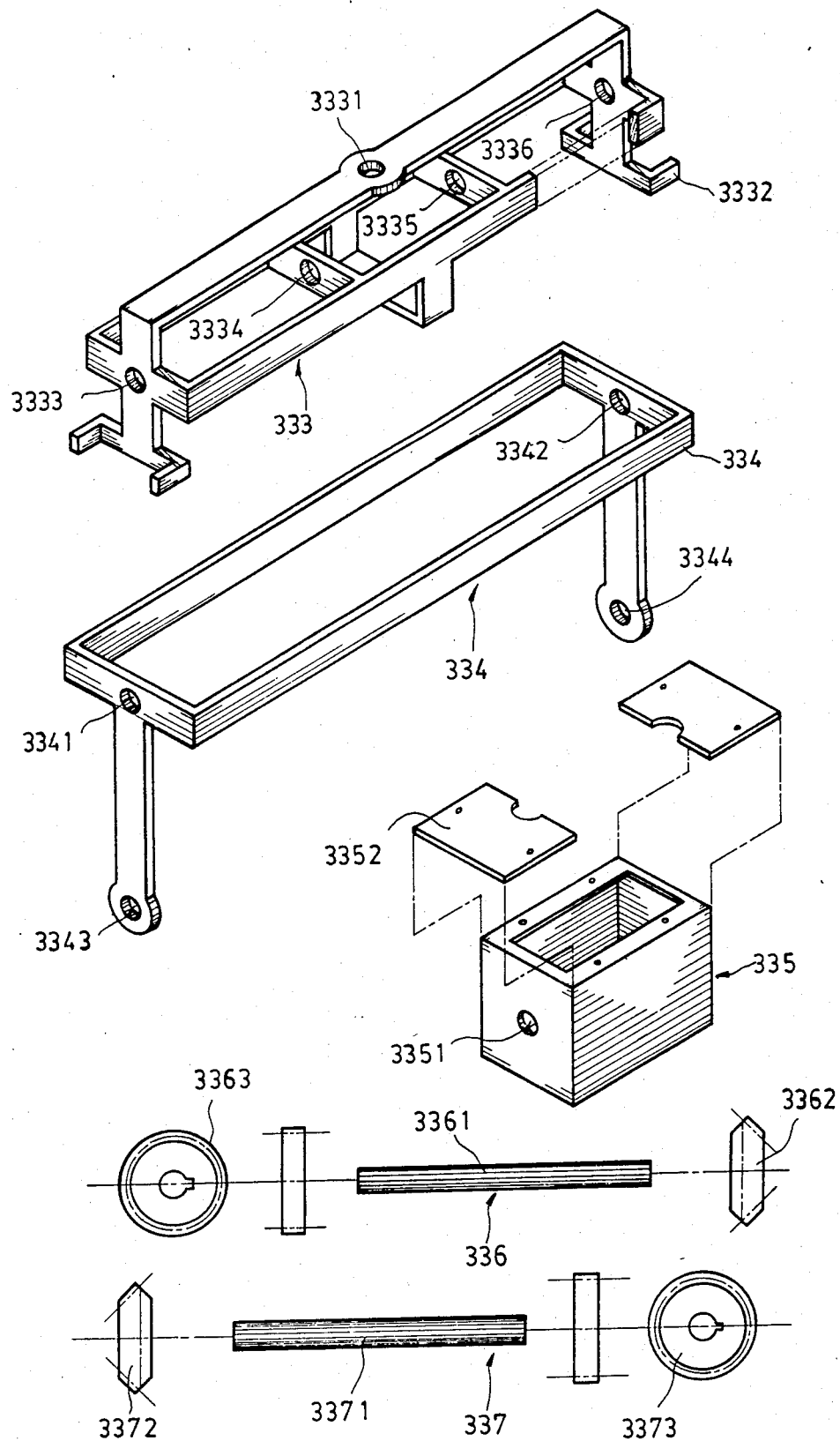
FIG. 14 is a disassembled view of a suspension frame of the present invention.
Figure 15:
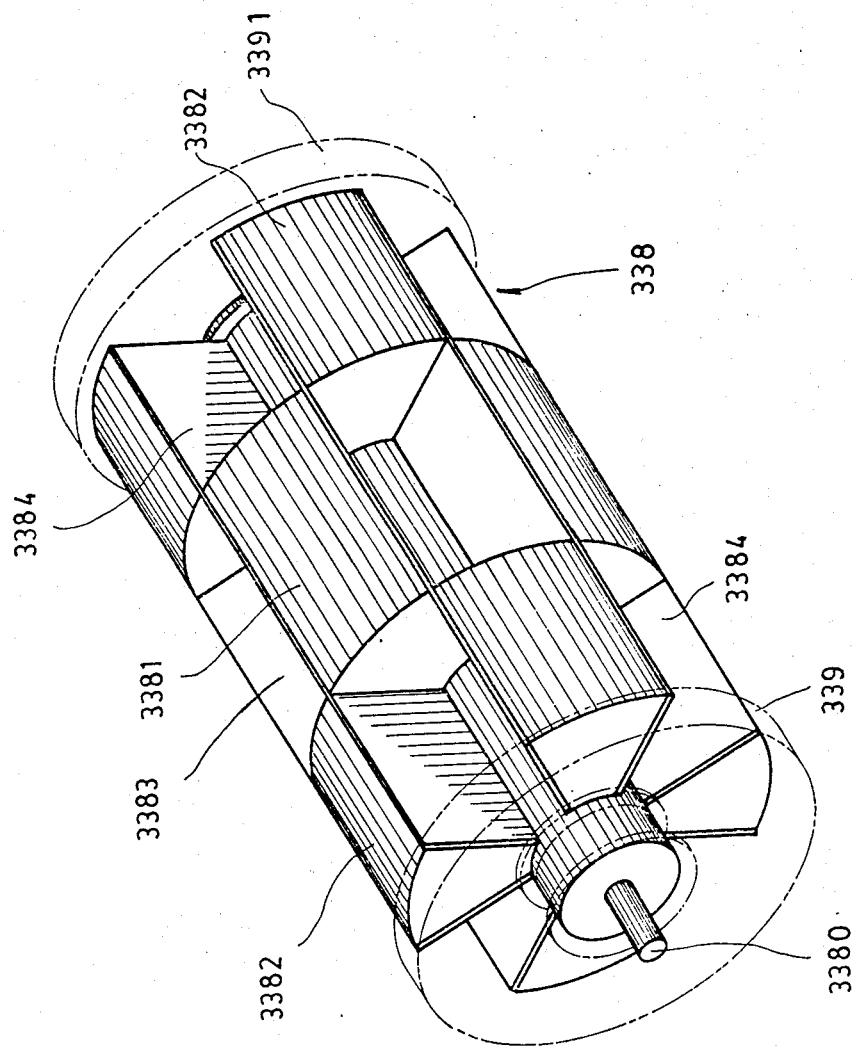
FIG. 15 is a perspective view of an absorbing wheel in the absorber.

Referring to FIG. 11, there is shown a one-wheel type of ascending and descending assembly 330, which includes a connecting frame 3340 as shown in FIG. 12 and an absorbing wheel 338 as shown in FIG. 15, and which are further described as follows:

The component shown in FIG. 12 includes the transmission shaft 331, the ascending and descending frame 332, the bevel gear 3317 as shown in FIG. 13, and the suspension frame 333, the swinging fork 334, the transmission shafts 3361 and 3371, the bevel gears 3362 and 3372, the flat gears 3363 and 3373, and the gear box 335 as shown in FIG. 14. The assembling procedures of the aforesaid component are that the power portion 3314 of the transmission shaft 331 as shown in FIG. 13 is put through a hole 3325 on the ascending and descending frame 332 as shown in FIG. 13, and then put through a hole 3331 on the suspension frame 333 as shown in FIG. 14; a bevel gear 3317 as shown in FIG. 13 is fixedly mounted on the lower end 3315 of the transmission shaft 331 so as to have the ascending and descending frame 332 shown in FIG. 13 and the suspension frame 333 shown in FIG. 14 mounted on the shaft between the stop collar 3313 and the bevel gear 3317, and to let the ascending and descending frame 332 and the suspension frame 333 rotate freely. After the aforesaid steps, mount the parts 3361, 3362, 3363, 3371, 3372, 3373, 335, 3351, and 3352 as shown in FIG. 14 on the suspension frame 333; load the gear box 335 with lubricating oil; then, the swinging fork 334 is mounted over the suspension frame 333 to form the connecting frame 3340 as shown in FIG. 12. In that case, if the ascending and descending frame 332 is not turned horizontally, the suspension frame 333 underneath the frame 332 will carry the swinging fork 334 and the absorbing wheel 338 to rotate horizontally together; simultaneously, the swinging fork 334 carrying the absorbing wheel 338 is mounted on the transmission shafts 3361 and 3371 to swing back and forth at an angle of 20°, which is limited with a stop arm 3332. The procedures of mounting the parts (335, 336 to 3373, 334, etc.) as shown in FIG. 14 are as follow:

Mount the flat gear 3363 on the left end of the shaft 3361, and let the shaft end pass through a hole 3333 on the left side of the suspension frame 333, and the hold 3341 on the left side of the swinging fork 334; let the right end pass through a hole 3334 on the suspension frame 333, and also through a hole 3351 on the left side of the gear box 335, and then mounte the bevel gear 3362 on the right end of shaft 3361. In that case, the bevel gear 3362 and the bevel gear 3317 are engaged together as as shown in FIG. 12-1. Subsequently, mount the bevel gear 3372 on the right end portion of the transmission shaft 3371, and let the right end of shaft 3371 pass through a hole 3336 on the right side of the suspension frame 333 and a hole 3342 on the right side of the swinging fork 334; then, let the left end of the shaft 3371 pass through a hole 3335 on the suspension frame 333, and a hole 3351 on the right side of the gear box 335, and then mount the bevel gear 3372 fixedly on left end of the shaft 3371 so as to have the bevel gears 3372 and 3317 engaged together. Load the gear box with lubrication oil so as to have the three gears 3362, 3372, and 3317 lubricated therein. Finally, mount the gear box cover 3352 (two pieces) between the hole 3331 and the gear 3317 to close the gear box 335 as shown in FIG. 12-1.

Figure 16:
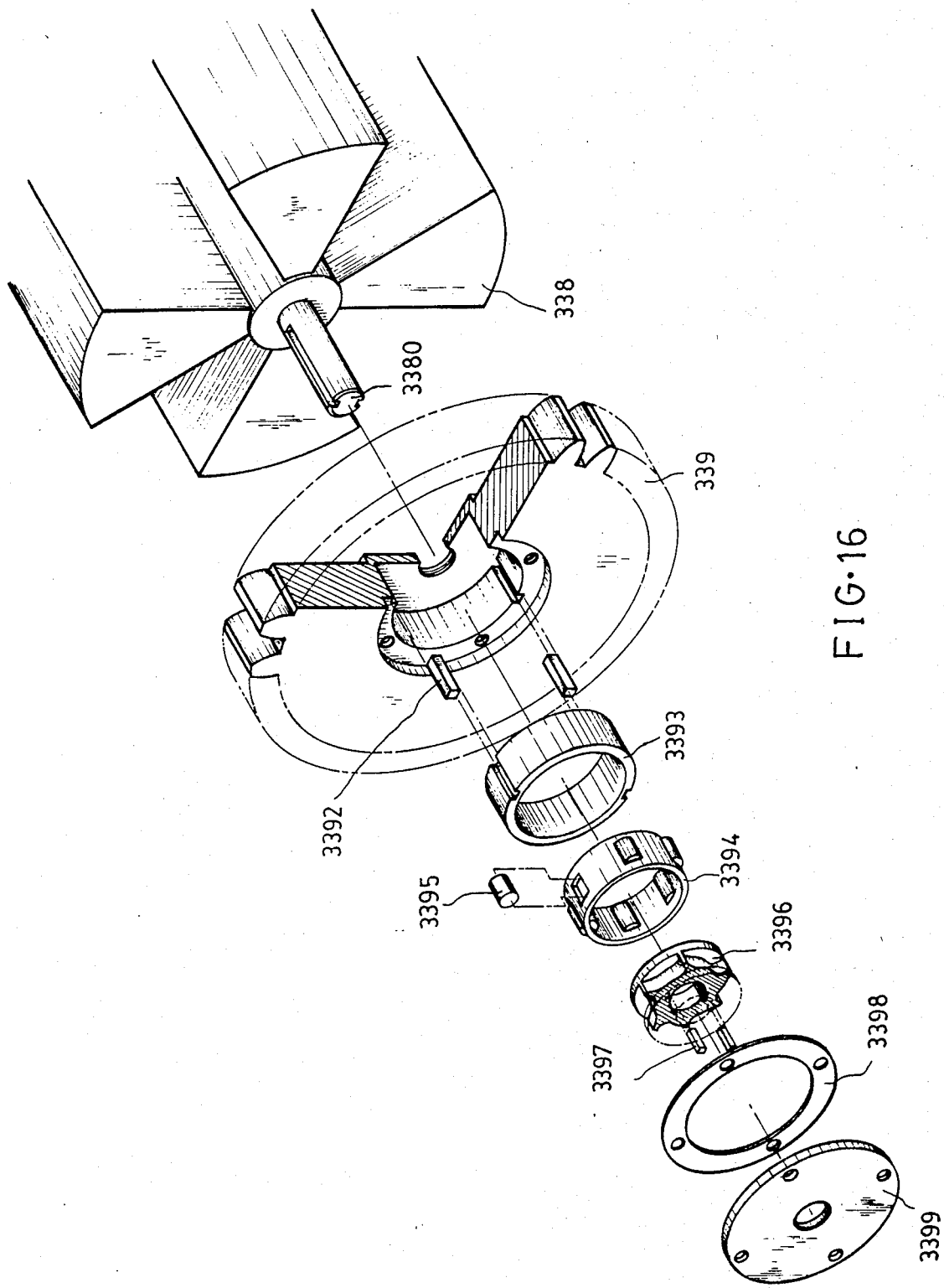
FIG. 16 is a disassembled view of the one-way transmission gear in the absorbing wheel.

Referring to FIG. 15, there is shown an absorbing wheel 338, which is to be substantially contacted with the water surface so as to absorb the motive force (both moving up and down, and moving back and forth)of the sea water to convert that force into a mechanical force. The absorbing wheel comprises four buoys 3381 having the same dimensions and eight buoys 3382 having identical dimensions being mounted around the absorbing wheel. The buoy 3381 has a length being twice as that of the buoy 3382. Between two buoys, there is furnished with a hollow space. In the axial center of the wheel 338, there is fixedly mounted with a wheel shaft 3380, of which both ends protrude out of the buoys, and are mounted with two one-way transmission gears 339 and 3391 respectively. The counter-clockwise motive force from the shaft 3380 will, through one-way transmission gear 339, be transmitted to the gear 3363, the shaft 3361, the gear 3362, the gear 3317 and the shaft 331 (as shown in FIGS. 6 and 12-1); the shaft 331 will rotate counter-clockwise. Upon the gear 3391 being driven by shaft 3380 to rotate clockwise, the motive force will transmitted to the gear 3373, shaft 3371, gear 3372, gear 3317, and shaft 331, which will rotate counter-clockwise. Each of the two one-way transmission gears includes keys 3392, a sleeve 3393, a roller collar 3394, rollers 3395, a roller clutch 3396, keys 3397, a packing ring 3398, and a fixing plate 3399, etc. as shown in FIG. 16. (The structure of the one-way transmission gear is similar to that of the one-way transmission gear currently existing in the market.)

The aforesaid absorbing wheel 338 as shown in FIG. 15 has four major functions as follows:

1. To absorb the up-and-down motive force of the sea-wave and to convert that force into a mechanical force:

Since the absorbing wheel 338 is equipped with a number of buoys 3381 and 3382, the whole ascending and descending assembly 330 shown in FIG. 11 can float up and down together with the sea-wave; as a result, the two racks in the assembly 330 will move up and down to actuate the two one-way transmission gears 326 and 327 shown in FIG. 7 to produce a mechanical force.

Figure 4:
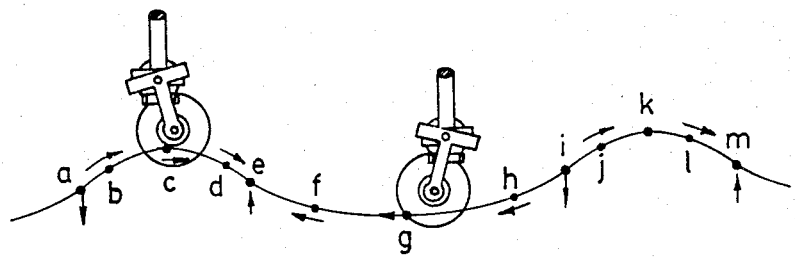
FIG. 4 illustrated a one-wheel type of absorbers being swung on the sea-wave automatically.

2. To absorb the horizontal motive force, the uphill motive force, and the downhill motive force of the water stream to convert into a mechanical force;

Upon the absorbing wheel 338 of the ascending and descending assembly 330 being floated at the points b, c, d, or j, k. l, the absorbing wheel 338 will swing to the right side at a given angle as a result of the forward motive force of the water stream as shown in FIG. 4; during that moment, the left side wall of the buoys under the absorbing wheel will absorb the forward motive force of the water stream to cause the wheel to rotate counter-clockwise, and that mechanical force will be transmitted by the one-way transmission gear to the gear 3362 (shown in FIG. 12-1), to gear 3317, and the shaft 331.

3. T absorb the backward, the downhill and uphill motive forces of the water stream to convert them into a mechanical force:

Upon the ascending and descending assembly 330 being floated within the section from "e" to "i" shown in FIG. 4, the water stream will have a backward, downhill and uphill motive forces to cause the absorbing wheel 338 to swing to the left side at a given angle as a result of the backward motive force of water stream as shown in FIG. 4; in that moment, the right wall of the buoys under the absorbing wheel will absorb the backward motive force of the water stream to cause the wheel to rotate clockwise for generating a mechanical force, which will be transmitted by the one-way transmission gear 3391 to gear 3372 (shown in FIG. 12-1), to gear 3317 and shaft 331. (When the one-way transmission gear 339 is rotating to transmit force, the gear 3391 on shaft 3380 rotates idly in a direction opposite to the rotating direction of gear 339; upon the gear 3391 rotating to transmit force, the gear 339 on shaft 3380 rotates idly in a direction opposite to the rotating direction of gear 3391.)

4. Having no resistance loss:

Since the buoys are symmetrically mounted around the absorbing wheel, the contact area between the buoys and the water is always in a balanced condition no matter the wheel stops at any angle; therefore, the absorbing wheel can rotate freely on water surface without having resistance; in other words, when either a forward moving or backward moving water stream pushes the wall of the buoys, the absorbing wheel may ratate forwards or backwards without having any resistance loss.

The absorbing wheel should be made of a material which would not be corroded by the sea water and should have less weight, such as a plastic steel or the like; so as to minimize the rotative inertia during the wheel to change rotating direction.

After the absorbing wheel being assembled, they may be mounted on the connecting frame 3340 by having the both ends of wheel shaft 3380 mounted in the two holes 3343 and 3344 of the connecting frame respectively, and an ascending and descending assembly 330 is formed as shown in FIG. 11.

Upon a frame assembly 310, an ascending and descending assembly 330 and an air compressor being ready, a one-wheel type of absorber "R" as shown in 6 may be assembled by following the procedures of mounting the ascending and descending assembly into the frame assembly 310, i.e., to have the four pulling rods 3321 passed through the eight holes 301 on the frame assembly shown in FIG. 7, and then having the two racks 3322 and 3323 passed through the four forks 302 in the frame assembly, and having one transmission shaft 331 of the ascending and descending assembly passed through a sleeve 303, and then to let a hole 3328 on the top frame 3326 shown in FIG. 13 engage together with the top end 3316 of the transmission shaft 331, and having the four holes 3327 on the top frame 3326 fixedly mounted on the top end 3330 of the pulling rods 3321; finally, mount the air compressors 370 and 380 on the frame assembly by means of four holes 304 and the other four holes 305, and a one-wheel type of absorber as shown in FIG. 6 is assembled.

It is apparent, by means of the structure of the absorber shown in FIG. 6, that the ascending and descending frame 332 can serve two purposes, i.e. (1) for mounting the two racks 3322 and 3323 so as to absorb the up-and-down motive force of the sea-wave to convert it into mechanical force, (2) to prevent the shaft 331 from being broken or bent by the sea-wave by means of the four pulling rods 3321. After the suspension frame 333 and the swinging fork 334 being assembled together, they also serve two purposes, i.e., (1) after the suspension frame 333 being hung under the ascending and descending frame 332, the frame 333 can swing horizontally; since the seinging fork 334 on the suspension frame 333 can swing back and forth at a small angle, the absorbing wheel 338 in the absorber can always face the moving direction of the water stream perpendicularly so as to absorb the motive force of water stream; for instance, during the absorber being floated in section $\overline{ac}$ or $\overline{eg}$, a forward moving water stream, shown in FIG. 4, the absorbing wheel 338 will swing to the right shown in FIG. 4, the point A; in that moment, the axis of the shaft is perpendicular to the moving direction of the water stream for completely absorbing the motive force of water stream to convert into mechanical force; upon the absorber being floated in a water stream moving backwards as shown in section $\overline{ce}$ in FIG. 4, the absorbing wheel will swing as shown in FIG. 4, the point B, i.e., the axis of the wheel being perpendicular to the direction of a backward moving water stream so as to completely absorb the motive force of water; (2) upon the moving direction of the sea-wave changing, the facing direction of the axis of the absorbing wheel 338 will automatically adjust to a direction perpendicular to the moving direction of the water stream.

The operation theory of the absorber:

After the absorber "R" shown in FIG. 6 being ready, it will be mounted to the rigid frame 201 of the cross-shaped absorber frame by means of the upper and lower square frames 311 and 313 thereof. Use four such cross-shaped absorber frames to form a #-shaped absorber frame on the shore as shown in FIG. 1-2; then, put a given number of #-shaped absorber frames on the sea to form into an absorbing network. In that case, the ascending and descending assembly 330 of the absorber will be ready to receive the motive force of the water stream to convert it into mechanical force. The detailed operation theory is described as follows:

1. To absorb the moving upward force of the water stream:

Referring to FIG. 6, there is shown a one-wheel type of absorber "R"; upon the water stream under the absorber changing from a wave recess into a wave peak, the absorbing wheel 338 will float upwards to cause the suspension frame 333 to drive the ascending and descending frame 332 moving upwards; simultaneously, the rack 3322 in the frame 332 will drive the one-way transmission gear 326 of the frame assembly 310 to rotate counter-clockwise, and then the gear 326 will transmit the motive force to the transmission shaft 325 rotating counter-clockwise. (At the same time, the other one-way transmission gear 327 on the shaft 325 will be driven by a rack 3323 to rotate clockwiseidly.)

Simultaneously, the shaft 325 will transmit the motive force to a belt pulley 329, which will, through a belt 3292, drive an air compressor 380 by means of an input wheel 3291 so as to produce a pneumatic force. Upon the water stream under the absorber "R" moving from a wave peak to a wave recess, the whole ascending and descending assembly 330 will drop downwards, and the other rack 3323 will move downwards to pull the other one-way transmission gear 327 to rotate counter-clockwise. (In that case, the gear 326 on shaft 325 is driven by rack 3322 to rotate clockwise idly.) The motive force will, from gear 327, through shaft 325, the belt pulley 329 and the input wheel 3291, etc. be transmitted to the air compressor 380 to produce a pneumatic force.

2. To absorb the horizontal, uphill, and downhill forward motive forces of the water stream:

Referring to FIGS. 6 and 12-1, there is shown an absorber "R"; when the absorber is floating in section of $\overline{ad}$ or $\overline{je}$ of the sea-wave as shown in FIG. 4, the left side wall of buoys of the lower half wheel will be driven by the water stream to cause the absorbing wheel 338 to rotate counter-clockwise. The driving force of wheel 338 will, through the shaft 3380, be transmitted to a one-way transmission gear 339, which will rotate counter-clockwise. (Simultaneously, the one-way transmission gear 3391 on the shaft 3380 of the other end of wheel 338 will rotate clockwise idly.) The driving force of gear 339 will be transmitted through the gear 3363, shaft 3361, gear 3317, the shaft 331, the gear 323, the belt pulley 328, and the belt pulley 371, and finally transmitted to the air compressor 370, whereby a pneumatic force is produced.

3. To absorb the horizontal, uphill, and downhill backward motive force of the water stream:

Upon the absorber "R" shown in FIGS. 6 and 12-1 floating in section $\overline{ei}$ as shown in FIG. 4, the right side wall of the buoys under the lower half portion of the absorbing wheel 338 will be driven by the water stream to cause the wheel 338 to rotate clockwise. The driving force of wheel 338 will be transmitted through shaft 3380, and then to the one-way transmission gear 3391, which will rotate clockwise. (Simultaneously, the one-way transmission gear 339 on the other end of shaft 3380 will rotate clockwise idly.) The driving force of the gear 3391 is further through gear 3373, shaft 3371, the bevel gear 3372, gear 3317, the shaft 331, the bevel gear 323, the belt pulley 328, and finally to belt pulley 371 for driving the air compressor 370 to produce a pneumatic force. (The compressors 370 and 380 shown in FIG. 6 each stand for an air compressor, 3.5 kg/cm$^2$; 373 and 383 stand for the air filters of the air compressors 370 and 380 respectively; 374 stands for the exhausting port of air compressor 370.)

Figure 17:
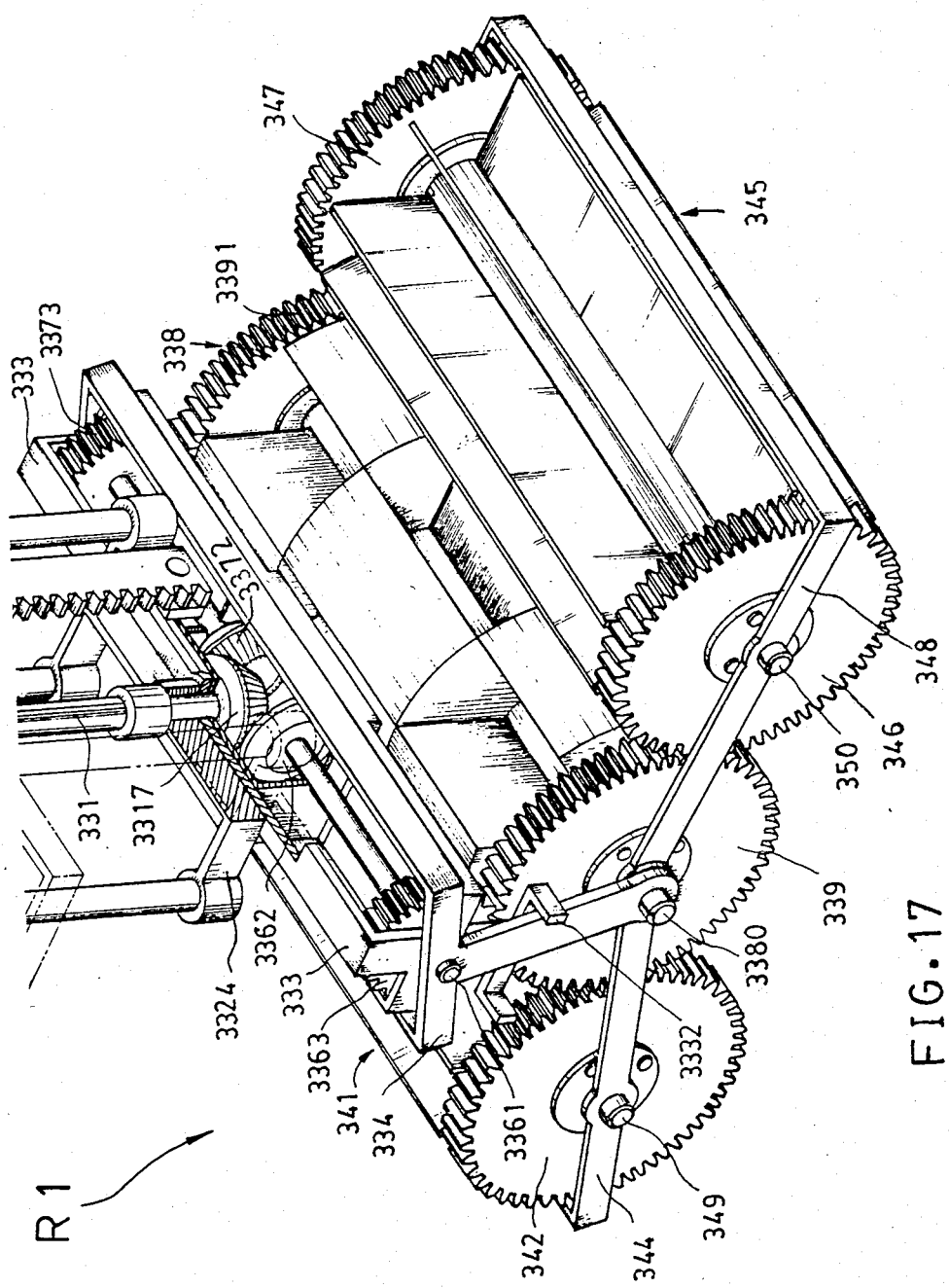
FIG. 17 is a perspective view of the three-wheel type of absorber.

In the three-wheel type of absorber "R1":

Referring to FIG. 3, there is shown a complete cycle of a sea-wave form, in which the length of moving up and down is shorter than that of moving forwards and backwards; in other words, the effective moving distance in back and forth direction is much greater than that in the up and down direction. Therefore, the absorber should be so designed as to increase the absorbing capability of absorbing the back and forth motive force of the sea-wave. According to the aforesaid principle, a three-wheel type of absorber is designed on the basis of experiment in a hope of increasing the absorbing efficiency of the absorber, which is described further as follows:

1. Structure:

Referring to FIG. 17, there is shown the lower portion of a three-wheel type of absorber "R1" (The upper portion of which is omitted as being the same as that of the one-wheel type of absorber.), in which the vane wheels 341 and 345 are mounted in front and rear of the absorbing wheel 338 respectively. At the both ends of each of the vane wheels, there are mounted with two one-way transmission gears respectively. The two vane wheels are not used for absorbing the up and down motive force of the sea-wave, but for absorbing the forward and backward motive force of the sea-wave, and transmitting that force to the transmission system. The two vane wheels are mounted with two U-shaped frames 344 and 348 respectively, which are pivotally mounted on the wheel shaft 3380 so as to float up and down freely in close contact with the water surface by at least half height of the vane wheels for the purpose of absorbing the forward and backward motive force of the sea-wave. The one-way transmission gear 346 is mounted on one end of the vane wheel 345, while the other one-way transmission gear 347 is mounted on the other end of the vane wheel 345. The structure of all the aforesaid one-way transmission gears is the same as that of the one-way transmission gear shown in FIG. 16.

2. The motive force transmission passage:

All the transmission force absorbed by the aforesaid wheels 338, 341 and 345 will first be transmitted to the bevel gear 3317, after which the transmission passage will be the same until the belt pulley 371 as shown in FIG. 6, i.e., the driving force of gear 3317 will pass through the shaft 331, the gear 321, 323, the belt pulley 328, and the belt 372 and finally to the belt pulley 371, which will drive the air compressor 370 for producing pneumatic force.

In the aforesaid three wheels 338, 341 and 345, the one-way transmission gears mounted on their both ends each have their transmission passages to transmit the motive force to the gear 3317 almost simultaneously without interference one another. The individual transmission passages are described in detail as follows:

1. The counter-clockwise rotative force of wheel 338 will be transmitted to gear 3317 through gears 339, 3363 and 3362; the clockwise rotative force of wheel 338 will be transmitted to gear 3317 through gears 3391, 3373 and 3372.

Figure 5:
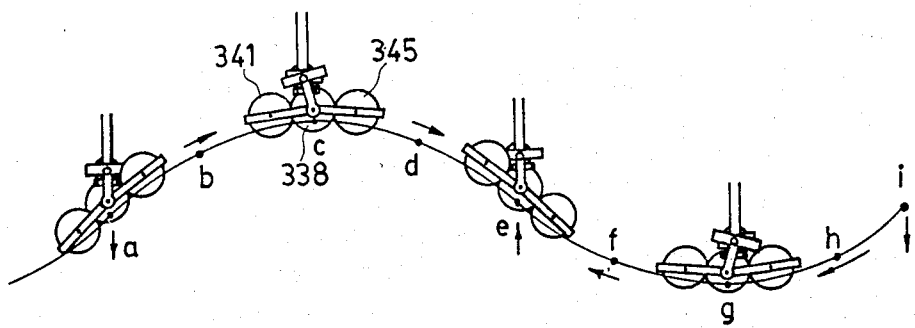
FIG. 5 illustrates a three-wheel type of absorbers being swung on the sea-wave.

2. The counter-clockwise rotative force of the wheels 341 and 345 will be transmitted to gear 3317 respectively through gear 343 (which is mounted on the other end of wheel 341), gear 347, 3391, 3373, and 3372; the clockwise rotative force of the wheels 341 and 345 will be transmitted to gear 3317 through gear 342, 346, 339, 3363 and 3362. In that case, the sea-wave motive force in any portion of a wave length can be absorbed and transmitted to gear 3317 through a systematic steps without being interfered each other; for example:

1. Upon the three-wheel type of absorber "R1" being floating on the point "C" in section $\overline{ae}$ shown in FIG. 5, the three wheels 338, 341 and 345 will be driven to rotate counterclockwise; simultaneously, the motive force of wheel 338 will be transmitted to gear 3317 through gear 339, 3363, and 3362. The motive force of wheels 341 and 345 will be transmitted to gear 3317 through gear 343 (being mounted at one end of the wheel 341), gear 347, 3391, 3373 and 3372. (Simultaneously, the gears 342 and 346 will rotate idly on shafts 349 and 350 respectively.)

2. Upon the absorber "R1" being floating on the point "g" in section $\overline{ei}$ shown in FIG. 5, the three wheels 338, 341 and 345 will be driven to rotate clockwise; simultaneously, the motive force of wheel 338 will be transmitted to gear 3317 through gears 3391, 3373, and 3372. The motive force of wheel 341 and 345 will be transmitted to gear 3317 through gears 342, 346, 339, 3363 and 3362. (Simultaneously, the gears 343 and 347 will rotate idly on shafts 349 and 350 respectively.)

3. Upon the absorber "R1" being floating on point "a", i.e. the location of wheel 338 shown in FIG. 5, the forward or backward motive force of the water stream will be zero, while the waterstream on the position of the wheel 341 has a backward motive force, and the water stream on the position of the wheel 345 has a forward motive force; consequently, the wheel 338 will absorb no motive force because that the wheel 341 will be driven by the backward motive force of the water stream to rotate clockwise, while the wheel 345 will be driven by the forward motive force to rotate counter-clockwise. The rotative force of wheel 341 will be transmitted to gear 3317 through gears 342, 339, 3363, and 3362, while the rotative force of wheel 345 will be transmitted to gear 3317 through gears 347, 3391, 3373, and 3372. (Simultaneously, the gears 346 and 343 will rotate idly on their shafts respectively.)

4. Upon the absorber "R1" being floating on point "e", i.e. the location of wheel 338, the forward and backward shown in FIG. 5, motive force of the water stream will be zero, while the water stream on the position of wheel 341 has a forward motive force, and the water stream on the position of the wheel 345 has a backward motive force; consequently, the wheel 338 will absorb no motive force because that the wheel 341 will be driven by the forward motive force to rotate counter-clockwise, while the wheel 345 will be driven by the forward motive force to rotate counterclockwise. The rotative force of wheel 341 will be transmitted to gear 3317 through gears 343, 3391, 3373 and 3372, while the rotative force of wheel 345 will also be transmitted to gear 3317 through gears 346, 339, 3363 and 3362. (Simultaneously, the gears 347 and 342 will rotate idly on their shafts respectively.) The diameter of the absorbing wheel, the tare weight of the ascending and descending assembly, and the height of the cross-shaped absorber frame:

For the diameter of the absorbing wheel, on professor of the oceanograply department of a university said after careful study that, on a sea surface having a wave height of one meter on an average, the portion of the vane wheel in the water should be approximately 80 cm; that data may be used as a reference during performing the experiment on the present invention.

The tare weight of the ascending and descending assembly in the absorber should be designed in such a manner as to be equal to the displacement of the absorbing wheel; in that case, the mechanical portion would not vibrate during operation.

As to the height of the portion of the portion of the cross-shaped absorber frame above the water surface, the inventor prefers five meters because of that height being adaptable to the high and low waves.

The horse power to be obtained from the absorber:

According to the aforesaid data, the absorbing wheel of a one-wheel type of absorber having a diameter of two meters and a length of two meters will have a displacement of 1.57 tons. A one-wheel type of absorber may be able to absorb a sea-wave mation energy of about 2.512 HP per second (which may need further amendment during actual experiment) on the assumption that the ascending and descending assembly in the absorber can, upon having load, rise a height of 0.6 meters; that upon a wind of 4 to 5 class (the height of wave being about one meter) blowing on the sea, there is measured with six sea-waves passing through a specific point per minute; and that the potential energy of the sea-wave is equal to the kinetic energy thereof.

Maintenance on the absorbing network:

The maintenance for an absorbing network should be performed periodically in a manner similar to that for an ocean ship; for example, a ship usually enters into a dockyard yearly or semi-annually for inspection and re-painting. In case of a typhoon approaching, the absorbing network should be disassembled into many "#"-shaped absorber frames, and pulled into a haven. After the typhoon being over, the whole frames will again be pulled to the sea to re-assemble into an absorbing network for normal operation. If the strong spring in the network is really strong enough to furnish the network with a buffer function, the absorbing network may not be pulled into a haven. Perpetual and continuous pneumatic generating station system:

The generating method according to the present invention may be called as a perpetual generating station because that a given percentage of the pneumatic force absorbed by the absorbing network can be converted into a liquid air being stored up. In case of the motive force of the sea-wave being too weak to generate power, the liquid air will be converted into a gas immediately to drive the generator for supplying electric power continuously. The reason of using the liquid air as a spare energy is that the liquid air has two advantageous characteristics, of which the first is its small dimensions with a powerful energy to be released; for example, one cubic meter ($1M^3$) of liquid air can generate a pneumatic or expanded energy of 42.56 million kilograms; the second is its advantage of being stored up; the liquid air may be stored into a double layer vacuum container (something like a vacuum flask) for any period of time desired.

Figure 18:
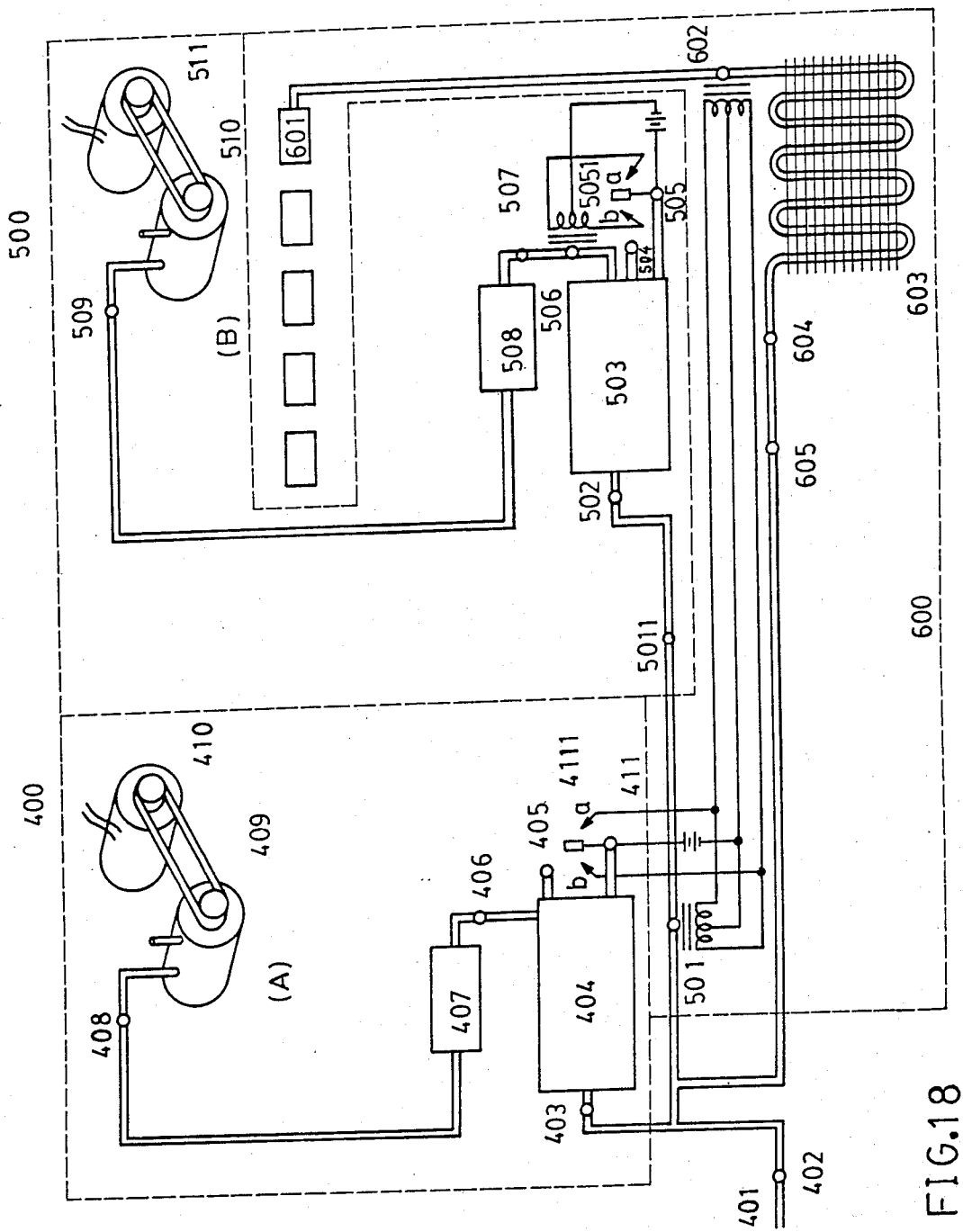
FIG. 18 is a block diagram of the present invention.

Referring to FIG. 18, there is shown a block diagram of the perpetual continuous pneumatic generating system, which comprises three major parts, i.e., (1) the generating system 400, (2) the liquid producing system 500, and (3) the liquid air converting into pneumatic force system 600, which are described in detail as follows:

1. The generating system 400:

In FIG. 18, 401 stands for a main air pipe being used for collecting the high-pressure compressed air (supposing 35 $kg/cm^2$) from the various absorbers in the absorbing network, and for transmitting the compressed air to the container on shore. The high-pressure compressed air are divided after the main air pipe 401, into two parts A and B; part A is to be used as a pneumatic force to drive a generator, while part B.is to be converted into a liquid air. 402 stands for an air pressure gauge in pipe 401. 404 stands for an air storage tank, while 403 stands for a check value for releasing the air into the tank 404. 4051 stands for a safety valve for releasing the air pressure in tank 404 higher than 38 $kg/cm^2$ so as to protect the tank 404, and the safety value 4051 will close automatically upon the pressure with tank 404 reducing to the valve under 38 $kg/cm^2$. 406 stands for a pressure reducing valve, which will reduce the air pressure to 7 $kg/cm^2$ to drive the generator. 407 stands for an air storage tank to hold an air having a pressure of 7 $kg/cm^2$. 409 stands for a pneumatic motor A. 410 stands for a generator, and 408 stands for a pressure-limiting valve to provide the pneumatic motor A with a constant pressure per second so as to have the generator 410 run at a constant speed.

2. Liquid air producing system 500:

Referring to FIG. 18, there is shown a liquid air producing system 500, in which 501 stands for an air valve being controlled with an electrical means. 503 stands for an air storage tank. 5011 stands for a pressure-limiting valve, which will not allow the air to enter into the air storage tank 503 until the air pressure reaching 35 $kg/cm^2$. 502 is a check valve having the same function as that of 403. 504 is a safety valve of the air storage tank 503 to protect the storage tank. 505 is an electrically controlled means of air pressure. 506 is an electrically controlled valve; upon the air pressure inside 503 reaching 35 $kg/cm^2$, the pin electrode of 505 will swing rightwards to contact with the contact point "a", i.e., to turn on the current in 506, which will open a valve to the air storage tank 508 to let the air in 503 flow into 508. Upon the air pressure inside 503 reducing to approximate 7 $kg/cm^2$, the pin electrode of 505 will swing leftwards to contact with the contact point "b", i.e., to turn on the current in 506 in the opposite direction in relation to contact point "a" so as to close the air valve 506 to cut off the air flowing from 503 to 508. 507 is used for reducing the pressure of air coming from 503 from 35 $kg/cm^2$ to 7 $kg/cm^2$; in other words, 508 is always loaded with air at a pressure of 7 $kg/cm^2$. 509 is a pressure-limiting valve; 510 is a pneumatic motor B; 511 is a liquid air producing machine. Upon the air at a pressure of 7 $kg/cm^2$ entering into 510, 511 will produce liquid air immediately. The operation mode of 511 is different from that of generator 410; the generator 410 runs always, while 511 runs intermittently with regular intervals, and the length of that interval is dependent upon the volume of the air storage tank 503. The interval may be designed for about 20 minutes. (It should not be too long; otherwise, the dimensions of 503 have to be increased, and the construction material cost thereof will be increased.) Although the running time of the liquid air producing machine 511 is constant, the interval between the stop and the start is varicable as a result of the wind speed; for instance, when the wind velocity is at an average speed (i.e. between class 4 to 5, with the wave height at about one meter), the running time of 511 is approximately equal to the stop interval thereof. When the wind velocity is high (a higher wave), 511 will have a shorter stop interval, and vice versa. Upon the wind velocity reaching class 8 (approximate 20 meters per second, with the wave height at about five meters), 511 would run continuously. Upon the wind velocity at class 3 (approximate 3.4 meters per second, with the wave height at about 0.3 meters, 511 will be in a stop state continuously. In other words, when the wave is high, the air storage tank 503 can be fully loaded with the high pressure air at a shorter period of time, and therefore the stop interval of 511 is shorter as well, and vice versa. The aforesaid "stop" and "running" switching operation is automatically done by means of an electrically controlled means 505 and an electrically controlled valve 506.

3. The liquid air converting into pneumatic force system 600:

Referring to FIG. 18, there is shown the aforesaid converting system, in which 601 stands for a plurality of vacuum flasks to be filled with liquid air produced by 511; 603 stands for a number of radiators to gasify the liquid air; 602 is an electrically controlled valve to release the liquid air into 603; 604 is a check valve to prevent the gaseous high-pressure air (up to 210 kg/cm²) from flowing back to 603; 605 is a pressure reducing valve, which will have the high-pressure air (210 kg/cm²) reduced to 35 kg/cm²; 501 is an electrically controlled air valve; 411 is a pneumatic brake to control the air valves 501 and 602. Supposing that the sea-wave force is weak, the air pressure in the air storage tank 404 will be reduced to cause the pin electrode 4111 to swing left-wards to contact with the contact point "b" for turning on the circuits of 501 and 602 so as to close 501 for preventing the high-pressure air from 401 from entering into 503, and simultaneously to let the liquid air in 601 enter into 603 to gasify into gaseous air with a pressure of 210 kg/cm²; then, the high-pressure air will, through 605, be reduced to a pressure of 35 kg/cm², which will enter into 404 to increase the pneumatic force therein for maintaining the generator 410 to generate power. (Simultaneously, since 501 has been closed, the air coming from 605 would not enter into 503.) Upon the air pressure in 404 reaching 35 kg/cm², the pin electrode 4111 of 411 will swing right-wards to contact with the contact point "a" to turn on the other portion of circuits of 501 and 602. In that case, 602 turns off the pump for filling liquid air into 603, while 501 is opened to let the high-pressure air of 35 kg/cm² from 401 enter into 503. In the event of the air pressure in 404 being reduced to about 7 kg/cm², the various components 411, 602, and 501, etc. would repeat the aforesaid operation steps to replenish air to 404 in order to maintain the generator 410 running normally. Distribution of the wave force (or pneumatic force):

It has been described in the "Summary of the invention" that, in order to maintain the generator running continuously to generate power regardless of the strength of wave force, the general pneumatic force absorbed by the absorbing network is divided into two percentage portions A and B, of which the portion A is utilized to drive the generator, while the portion B is utilized to produce liquid air with the liquid air producing machine as a spare energy, which is to be utilized to drive the generator in case of the pneumatic force in short supply. The feature of the spare percentage system not only can let the generator run normally, but also can save a portion of energy from being wasted. The two percentage portions A and B may be calculated with two equations as follows:

$$bx = c(a - ax) \quad (1)$$

$$1 - x = d \quad (2)$$

In the aforesaid two equations, the meaning of a, b, c, d, x are described as follows:

1. "X" represents the percentage of total wave force (or pneumatic force) absorbed by the network that is to be distributed to the generator system 400.
2. "d" represents the percentage of total wave force (or pneumatic force) absorbed that is to be utilized to produce liquid air by the system 500.
3. "a" represents the sum of wind velocity of the days at least one year of a given area where an absorbing network is to be set up. (The wind velocity of 20 M/sec. should be deducted from the sum upon the network being pulled into a haven without absorbing wave force). Since the wind velocity is in direct proportion to the strength of wave force, the valve of wind velocity may be used for representing the strength of wave force upon calculating the distributed portion of the way force. For instance, in the table shown in FIG. 19, on a day-by-day basis there is shown the average wind velocity in the Lan Yu Island area in Taiwan, as established by the Central Weather Bureau, Republic of China i.e., from Jan. 1 to Dec. 31, the wind velocity was added from 8.2+8.1+10+... 19.7; (The wind velocity of July 8, Aug. 10 and Nov. 5 was not included because of the wind velocity of those dates having exceeded a speed of 20 M/sec. and the absorbing network being pulled back in a haven.) the total sum of the wind velocity if 3463.1 M.

4. "b" represents a sum by adding up the difference of between the average wind velocity and the wind velocity below that average velocity. In the vicinity of Lan-Yu island, for instance, the sum of wind velocity in 1976 (366 days) is 3463.1 M (excluding the days in which the wind velocity exceeded 20 M/sec.); the average wind velocity of that year is 9.46 M; then, add all the wind velocity of the days in which the velocity is less than the value of 9.46 M, i.e., 8.2 (on Jan. 1)+8.1(on Jan. 2)+7.0(on Jan. 4) ... 7.1 (on Dec. 25), a total of 1214.3 M in 205 days (including July 8, Aug. 10, and Nov. 5). In the 205 days, the sum of the average wind velocity is 1939.3 M, while the sum of the wind velocity below the average velocity is 1214.3 M. The difference between the aforesaid sums is 725 M (which is represented with "b").

5. "c" represents a coefficient (0.2227), which is a ratio between the expansion capacity of a given quantity of liquid air and the energy that is required to produce such quantity of liquid air. The aforesaid valve is provided by a manufacture, which usually produces liquid nitrogen, oxygen, and argon, and that manufacture has a liquid air producing machine, in which the ratio between the expansion capacity of the liquid air produced and the input capacity is about 0.2227, i.e. "c". ("c" is not an absolute figure; for the time being, it may be deemed as a reference date before being actual experiment.)

In order to explain the application of the aforesaid equations, an example is given as follows:

Supposing that an absorbing network is to be set up in the vicinity of Lan-Yu Island, around which the wind velocity in one year is shown FIG. 19. The percentage portions of the total pneumatic force absorbed by the absorbing network to be distributed to the generator system 400 and the liquid air producing system 500 as shown in FIG. 18 may be calculated as follows:

The wind velocity table of 1976 (366 days) shows the sum of wind velocity being 3463.1 M, i.e. "a" in equation (1) mentioned above; 725 M stands for "b" in equation (1), in which "c" is to be replaced with 0.2227. Substitute the three figures for a, b, c respectively in equation (1), bx=c (a−ax), for the valve of "X"; the result will be:

$$725x = 0.2227(3463.1 - 3463.1x),$$

$$x = 0.5154496, \text{ and}$$

$$d = 1 - x = 1 - 0.5154496 = 0.4845504$$

It is apparent that the pneumatic force to be allotted to the generating system 400 is 51.5%, and the pneumatic force to be allotted to the liquid air producing system 500 is 48.5%. The aforesaid two figures may be used as a reference upon setting up an absorbing netwrok in the vicinity of Taiwan. For other sea areas or other countries, the data of wind velocity thereof of at least one year must be available before calculating the two percentage portions.

DESIGN EXAMPLE

In order to understand the practical requirements in establishing a given generating system and an absorbing network thereof, a system to be set up in the vicinity of Lan-Yu Island may be used as an example.

According to the weather records of that area, the average wave height of that area in one year is about one meter. If the generator capacity required is 1,000 KW, the pressure of the air compressor to be used is 35 kg/cm², the capacity of the air storage tank 404 shown in FIG. 18 is ten-minute operation capacity for the motor A, and the capacity of the air storage tank 503 for producing liquid air is also a ten-minute capacity; then, find out the following answers:

1. The number of absorbers required, (2) the horse power of pneumatic motors A and B, and (3) the capacity of the air storage tanks 404 and 503 and the vacuum flash 601, which are described respectively as follows:

1. The number of absorbers required:

Before finding the number of absorbers, the number of wave force horse power required has to be calculated; since the output power required is 1.000 KW (1340 horse power), the input energy, i.e. the wave force has to be higher than that output. If the generator 400 shown in FIG. 18 has an input wave force being equal to 1.51515 times of its output horse power, its input horse power should be 2031 horse power. Supposing that the generating system 400 is allotted with 0.515449 of the total wave force absorbed as mentioned above, the liquid air producing system 500 will be allotted with 1−0.51544=0.4845504 of the total wave force absorbed by the network. Since the generating system 400 needs a wave force equal to 2031.032 horse power, the system 500 will need a wave force equal to 1909 horse power; in other words, the total wave force absorbed by the absorbing network is equal to 3940 horse power (HP). Since each one-wheel type of absorber can generate 2.512 HP as mentioned above, the whole absorbing network would at least need 1569 of such absorbers. If a cross-shaped absorber frame consists of 17 one-wheel type of absorbers as shown in FIG. 1-1, the whole absorbing network in this example would need at least 93 such cross-shaped absorber frames. It is possible to have more or less difference between the designed result and the actual result in real industrial employment. In this example, the number of absorbers designed may, upon being set up on the sea, encounter such a situation that the wave surface might be over the axis of the absorbing wheel upon the wheel being floated upwards, and the wave surface might be lower than the absorbing wheel upon the wave moving down-wards. That phenomena indicate that the absorbers in the network are too heavy, and that phenomena may be improved by adding a number of absorbers in the network. Upon discovering the wave surface floating up and down in the area of the lower half portion of the absorbing wheel within a small range, it indicates that the absorbers in the network are too light, and that phenomenon may be improved by reducing a number of absorbers.

2. The horse power (HP) of the pneumatic motor A and B:

In the aforesaid paragraph of "Distribution of the Wave Force", it has described that, under the situation of the average height of sea-wave being one meter, the absorbing network has to allot 51.5% of it pneumatic force absorbed to the generating system 400, while 48.5% of its pneumatic force in to be allotted to the liquid air producing system 500. Since the power for the generating system has been found as 2031 HP, the power for the liquid air producing system should have 1909 HP; in other words, the pneumatic motor A in the generating system may have a capacity of 2031 HP to drive the generator 410, but the pneumatic motor in the liquid air producing system should not have a capacity of 1909 HP; instead, it should have a capacity of 1909×2=3818 HP. The reason is that the pneumatic motor A will work continuously, while the pneumatic motor B will work intermittently; in other words, the motor B will run during ½ of a given period of time, and will reset during ½ of the given period of time. Therefore, the motor B has to work with a double capacity during the ½ working period to use up the pneumatic force allotted.

3. The volume of the air storage tanks 404 and 503, and of the vacuum flask 601:

The volume of the air storage tanks 404 and 503 shown in FIG. 18 should be so large as to be able to provide the pneumatic motor with sufficient force to run for about 10 minutes. The volume of the vacuum flask 601 shown in FIG. 18 should be such that the energy stored can at least drive the generator continuously for one year in case of the average wind velocity being under the level required. The details thereof are described as follows:

1. The folume of the air storage tank 404:

According to the foregoing paragraph of this example, the pneumatic motor A requires 2031 HP per secone, i.e., 91,396,440 meter/kg for ten minutes. Upon 1 m³ of compressed air at a pressure of 35 kg/cm² to be reduced at a pressure of 7 kg/cm², (The air pressure required by the pneumatic motor B shown in FIG. 18 is 7 kg/cm². ) the pneumatic energy released is 563,300 meter/kg; therefore, volume of the air storage tank 404 should be 162 M³.

2. The volume of the air storage tank 503:

According to the foregoing paragraph of this example, the pneumatic motor B requires 3460 HP per second, i.e., 155712440 meter/kg for ten minutes. Upon 1 m³ of a high pressure air of 35 kg/cm² to be reduced to 7 kg/cm², the pneumatic energy released is 563300 meter/kg; therefore, the volume of the air storage tank 503 should be 276 M³.

3. The volume of vacuum flask 601:

According to the foregoing paragraph of this example, the pneumatic motor A requires a pneumatic force of 2031 HP to drive the generator of 1,000 KW, i.e., 152327 meter/kg of wave force per second. If the wave force in short supply in the first second could be replenished in the next second, the volume of the vacuum flask should be 152327.2 meter/kg of liquid air, i.e., at least 4483 M³.

I claim:

1. A continuous pneumatic generating system to be driven by sea wave forces, comprising an energy absorbing network formed by a plurality of absorber units, each comprising a rigid frame movably supporting a vertically extending ascending and descending frame assembly, a suspension frame supported at a lower end of said ascending and descending frame assembly, a swinging member movably supported by said suspension frame, an absorber means rotatably supported by said swinging member and adapted to float on the surface of the sea, a gear linkage coupling said absorber means to one end of a drive member extending through said rigid frame, a transmission gear linkage coupling the other end of said drive member to an output means driving pneumatic means, and means for interconnecting all of said pneumatic means to provide a source of compressed fluid, whereby the wave forces applied to the absorber means are transmitted thereby to said gear and transmission gear linkages to actuate said compressor.

2. An absorber as claimed in claim 1, wherein said absorber means includes an absorbing wheel which is movably supported to float up and down to absorb the up and down motive force of the sea-wave, and also can absorb the forward and backward moving force, the uphill and forward motive force, the downhill and forward motive force, the uphill and backward motive force, and the downhill and backward motive force of the waves.

3. A cross-shaped absorber frame as claimed in claim 1, including a buoy secured to each unit to floatably support said unit, on the sea water, said unit having a cross-shaped frame furnished with strong springs for buffer effect, and with quick setup assemblies for setting up the network.

4. An absorbing network as claimed in claim 1, including a plurality of cross-shaed absorber frames, said interconnecting means being in the form of a pipe line system for collecting the compressed air from the various air compressors to transmit the air into a main air pipe; and said absorbing network is to be anchored at sea so as to absorb the wave force, said cross-shaped absorber frame being mounted with strong springs for buffer effect to protect the network upon being hit by a strong wave in a rough sea.

5. An absorber as claimed in claim 1, wherein each absorber unit is provided with a vane wheel of which each end is furnished with a one-way transmission gear in front of an absorbing wheel and a vane wheel in the rear of said absorbing wheel to form into a three-wheel type of absorber; and wherein said vane wheels can float on the wave surface with their large vanes so as to increase the absorbing capability of the middle absorbing wheel of a three-wheel type of absorber in absorbing the forward, backward, the uphill and forward, the downhill and forward, the uphill and backward, and the downhill and backward motive forces of the water stream.

* * * * *